United States Patent
Yasuda

(10) Patent No.: US 9,973,349 B2
(45) Date of Patent: May 15, 2018

(54) RELAY SYSTEM AND SWITCHING DEVICE

(71) Applicant: Hitachi Metals, Ltd., Minato-ku, Tokyo (JP)

(72) Inventor: Makoto Yasuda, Tsuchiura (JP)

(73) Assignee: Hitachi Metals, Ltd, Tokyo (JP)

( * ) Notice: Subject to any disclaimer, the term of this patent is extended or adjusted under 35 U.S.C. 154(b) by 112 days.

(21) Appl. No.: 14/951,982

(22) Filed: Nov. 25, 2015

(65) Prior Publication Data

US 2016/0156560 A1  Jun. 2, 2016

(30) Foreign Application Priority Data

Nov. 27, 2014 (JP) ................................ 2014-240612

(51) Int. Cl.
*H04L 12/801* (2013.01)
*H04L 29/12* (2006.01)
*H04L 12/46* (2006.01)
*H04W 88/04* (2009.01)

(52) U.S. Cl.
CPC ...... *H04L 12/4633* (2013.01); *H04L 12/4654* (2013.01); *H04L 12/4658* (2013.01); *H04L 12/4662* (2013.01); *H04W 88/04* (2013.01)

(58) Field of Classification Search
CPC ....... H04L 45/245; H04L 49/25; H04L 45/28; H04L 49/70; H04L 41/12; H04L 45/586; H04L 12/4641; H04L 45/66
See application file for complete search history.

(56) References Cited

U.S. PATENT DOCUMENTS

| 2007/0183376 | A1 | 8/2007 | Arai et al. | |
| 2008/0228943 | A1* | 9/2008 | Balus | H04L 12/462 709/239 |
| 2012/0020206 | A1* | 1/2012 | Busi | H04L 12/24 370/217 |
| 2012/0314715 | A1* | 12/2012 | Janardhanan | H04L 45/586 370/402 |
| 2013/0028135 | A1* | 1/2013 | Berman | H04L 12/4625 370/254 |
| 2013/0235876 | A1* | 9/2013 | Sajassi | H04L 41/12 370/401 |

(Continued)

FOREIGN PATENT DOCUMENTS

| JP | 2012-161027 A | 8/2012 |
| JP | 2012-209984 A | 10/2012 |

*Primary Examiner* — Melanie Jagannathan
*Assistant Examiner* — Najeebuddin Ansari
(74) *Attorney, Agent, or Firm* — Crowell & Moring LLP

(57) ABSTRACT

An encapsulation address of a first switching device is set so as to be different only in a mask bit in comparison with that of a second switching device. A learning information control unit of a third switching device does not learn the correspondence relation between a source customer address and a source encapsulation address in a first case and a second case. The first case corresponds to a case in which an encapsulated frame is received at an upper-link port and an encapsulation address corresponding to the source customer address is acquired from an address table. The second case corresponds to a case in which a difference between the source encapsulation address and the encapsulation address acquired from the address table lies only in the mask bit.

11 Claims, 18 Drawing Sheets

(56) References Cited

U.S. PATENT DOCUMENTS

| | | | |
|---|---|---|---|
| 2015/0010001 A1* | 1/2015 | Duda | H04L 45/74 370/392 |
| 2015/0010002 A1* | 1/2015 | Duda | H04L 45/74 370/392 |
| 2016/0036728 A1* | 2/2016 | Duda | H04L 12/4633 370/357 |
| 2016/0337234 A1* | 11/2016 | Duda | H04L 45/74 |

* cited by examiner

FIG. 12

IN CASE WHERE MASK bit = "1" IS PRECEDENCE VALUE

| EXISTING FDB LEARNING INFORMATION (MASK bit) | INPUT INFORMATION (MASK bit) | LEARNING BY OVERWRITING | UPDATE OF AGING TIMER |
|---|---|---|---|
| 0 | 0 | × | ○ |
| 0 | 1 | ○ | × |
| 1 | 0 | × | × |
| 1 | 1 | × | ○ |

FIG. 17

FDB OF SWE1a

| CMAC | IVID | BMAC | PORT ID/ MCLAG ID | AGING TIMER VALUE |
|---|---|---|---|---|
| CA1a | xxx | -- | {MCLAG1a} | t1a |
| CA1b | xxx | -- | {MCLAG2a} | t1b |
| CA2a | xxx | BA2a | {MCLAG3a} | t2a |
| CA2b | xxx | BA2a | {MCLAG3a} | t2b |
| ... | ... | ... | ... | |

FIG. 18

21: MCLAG TABLE

| MCLAG ID | PORT ID | CONTROL STATE |
|---|---|---|
| {MCLAG1a} | {Pm1} | FW |
| {MCLAG2a} | {Pm2} | FW |
| {MCLAG3a} | {Pm3} | FW |
| ... | ... | ... |

FIG. 19A

32a: RECEPTION-SIDE IVID MANAGEMENT TABLE

| SVID+RECEPTION PORT ID | BVID+RECEPTION PORT ID | IVID |
|---|---|---|
| yyy+{Pm1} | --- | xxx |
| --- | vvv+{Pm3} | xxx |
| ... | ... | ... |

FIG. 19B

32b: TRANSMISSION-SIDE IVID MANAGEMENT TABLE

| IVID+RECEPTION PORT ID | SVID | ISID | BVID |
|---|---|---|---|
| xxx+{Pm1} | yyy | --- | --- |
| xxx+{Pm3} | --- | zzz | vvv |
| ... | ... | ... | ... |

RELAY SYSTEM AND SWITCHING DEVICE

CROSS-REFERENCE TO RELATED APPLICATION

The present application claims priority from Japanese Patent Application No. 2014-240612 filed on Nov. 27, 2014, the content of which is hereby incorporated by reference into this application.

TECHNICAL FIELD OF THE INVENTION

The present invention relates to a relay system and a switching device, for example, a relay system in which a link aggregation group is set across two switching devices and an operation based on a PBB (Provider Backbone Bridge) standard is carried out and the switching device.

BACKGROUND OF THE INVENTION

For example, Japanese Patent Application Laid-Open Publication No. 2012-161027(Patent Document 1) discloses a configuration in which a node redundancy is applied to two edge switching devices disposed at the boundary of a MAC-in-MAC network. In this document, when MAC addresses of one edge switching device and the other edge switching device are defined as a representative address and a mate representative address, respectively, each of the two edge switching devices controls a stream of a frame based on the combination of the representative address and the mate representative address contained in a destination and a source of the frame.

For example, when an encapsulated frame destined for a representative address is received from a core switch and a destination customer address has not been learned, one of the two edge switching devices decapsulates the encapsulated frame and then relays it to an access port, and further relays the encapsulated frame to the other device via an IC port. Then, the other device also decapsulates the received encapsulated frame and then relays it to an access port.

Japanese Patent Application Laid-Open Publication No. 2012-209984 (Patent Document 2) discloses a configuration in which an inter-device link aggregation is set on each link between a customer edge in a user network and two provider edges in a MPLS network. When a packet is relayed between the user network and the MPLS network, only one of the two provider edges relays the packet based on a rule made in advance between the two provider edges.

SUMMARY OF THE INVENTION

As a redundant system, for example, a system in which two switching devices are connected to each other via bridge ports and a LAG is set on a plurality of ports including respective ports of the two switching devices as described in the Patent Document 2 has been known. In this redundant system, unlike a common LAG set in one switching device, a LAG is set across two switching devices. Therefore, in addition to general effects obtained by the LAG such as the redundancy for the fault of communication lines and the expansion of communication band, the redundancy for the fault of switching devices can be achieved.

In this specification, the inter-device LAG as described above is referred to as a multi-chassis link aggregation group (hereinafter, abbreviated as MCLAG). Also, the assembly of the two switching devices on which MCLAG is set is referred to as an MCLAG switch. Further, when viewed from one switching device of two switching devices, the other switching device is referred to as a peer device.

Further, as a technique for realizing a wide-area Ethernet, for example, the extended VLAN and the MAC-in-MAC have been known as described in the Patent Document 1. The extended VLAN is standardized by IEEE 802.1ad, and is a technique for extending the number of VLANs (Virtual Local Area Network) by adding a service-provider VLAN tag to a customer VLAN tag based on IEEE 802.1Q. The MAC-in-MAC is a technique of encapsulating a customer MAC (Media Access Control) frame by a service-provider MAC frame, thereby achieving the further extension of the number of VLANs based on the extended VLAN and the reduction of the number of MAC addresses learned in a switch (core switch) in a wide-area network. As a detailed method of the MAC-in-MAC, PBB based on IEEE 802.1ah has been known.

Here, the inventors of the present invention have examined the application of the MCLAG switch to the edge switching device of the PBB network. In this case, the MCLAG switch can receive a frame from the same customer terminal in the customer network at any of the MCLAG ports of the two switching devices. Then, when the destination of the received frame is a PBB network, each of the two switching devices encapsulates the corresponding frame by using its own MAC address as a source encapsulation address.

As a result, in another edge switching device in the PBB network, even when the frame from the same customer terminal is received, there are the case in which the source encapsulation address of the frame is a MAC address of one of the two switching devices and the case in which the address thereof is a MAC address of the other switching device. Consequently, there arises a problem that learning information on an address table is unnecessarily altered in spite of being intended for the same customer terminal.

The present invention has been made in view of the above-described problem, and one object thereof is to provide a relay system and a switching device capable of preventing such a problem in which learning information on an address table is unnecessarily altered.

The above and other objects and novel characteristics of the present invention will be apparent from the description of the present specification and the accompanying drawings.

The following is a brief description of an outline of the typical embodiment of the invention disclosed in the present application.

A relay system according to the embodiment has a first switching device, a second switching device and a third switching device which are disposed at an entrance or an exit of a PBB network in which a relay based on a PBB standard is carried out. Each of the first, second and third switching devices converts an unencapsulated frame received from outside of the PBB network into an encapsulated frame to relay the frame to the PBB network, and converts the encapsulated frame received from the PBB network into the unencapsulated frame to relay the frame to the outside of the PBB network. The unencapsulated frame contains a customer address, and the encapsulated frame has a configuration in which an encapsulation address is added to the unencapsulated frame based on the PBB standard. Here, each of the first switching device and the second switching device includes: a lower-link port which transmits or receives the unencapsulated frame; an upper-link port which transmits or receives the encapsulated frame; one or a plurality of MCLAG ports; and a bridge port. The one or a plurality of MCLAG ports include a first MCLAG port serving as the lower-link port on which an inter-device LAG is set. The bridge port serves as the upper-link port and connects its own device and a peer device with each other. The encapsulation address of the first switching device is set so as to be different only in a part of bit in comparison with the encapsulation address of the second switching device. The third switching device includes: a lower-link port; an upper-link port; an address table; and a learning information control unit. The address table retains the customer address present ahead of the lower-link port in association with a port identifier representing the lower-link port and retains the customer address present ahead of the upper-link port in association with the encapsulation address and a port identifier representing the upper-link port. The learning information control unit does not learn a correspondence relation between the source customer address and the source encapsulation address to the address table in a first case and a second case. The first case corresponds to a case in which the encapsulated frame is received at the upper-link port and the encapsulation address corresponding to the source customer address of the encapsulated frame is acquired from the address table. The second case corresponds to a case in which a difference between the source encapsulation address of the encapsulated frame and the encapsulation address acquired from the address table lies only in the part of bit described above.

The effects obtained by typical embodiments of the invention disclosed in the present application will be briefly described below. That is, in a relay system including MCLAG switches, it becomes possible to prevent a problem in which learning information on an address table is unnecessarily altered.

BRIEF DESCRIPTIONS OF TEE DRAWINGS

FIG. 12 is a supplementary view in which the main processing contents of FIG. 11 are summarized;

FIG. 17 is a schematic view showing a configuration example of an address table in FIG. 16;

FIG. 18 is a schematic view showing a configuration example of an MCLAG table in FIG. 16;

FIG. 19A is a schematic view showing a configuration example of a reception-side IVID management table of FIG. 16;

FIG. 19B is a schematic view showing a configuration example of a transmission-side IVID management table of FIG. 16.

DESCRIPTIONS OF THE PREFERRED EMBODIMENTS

Figure 1:
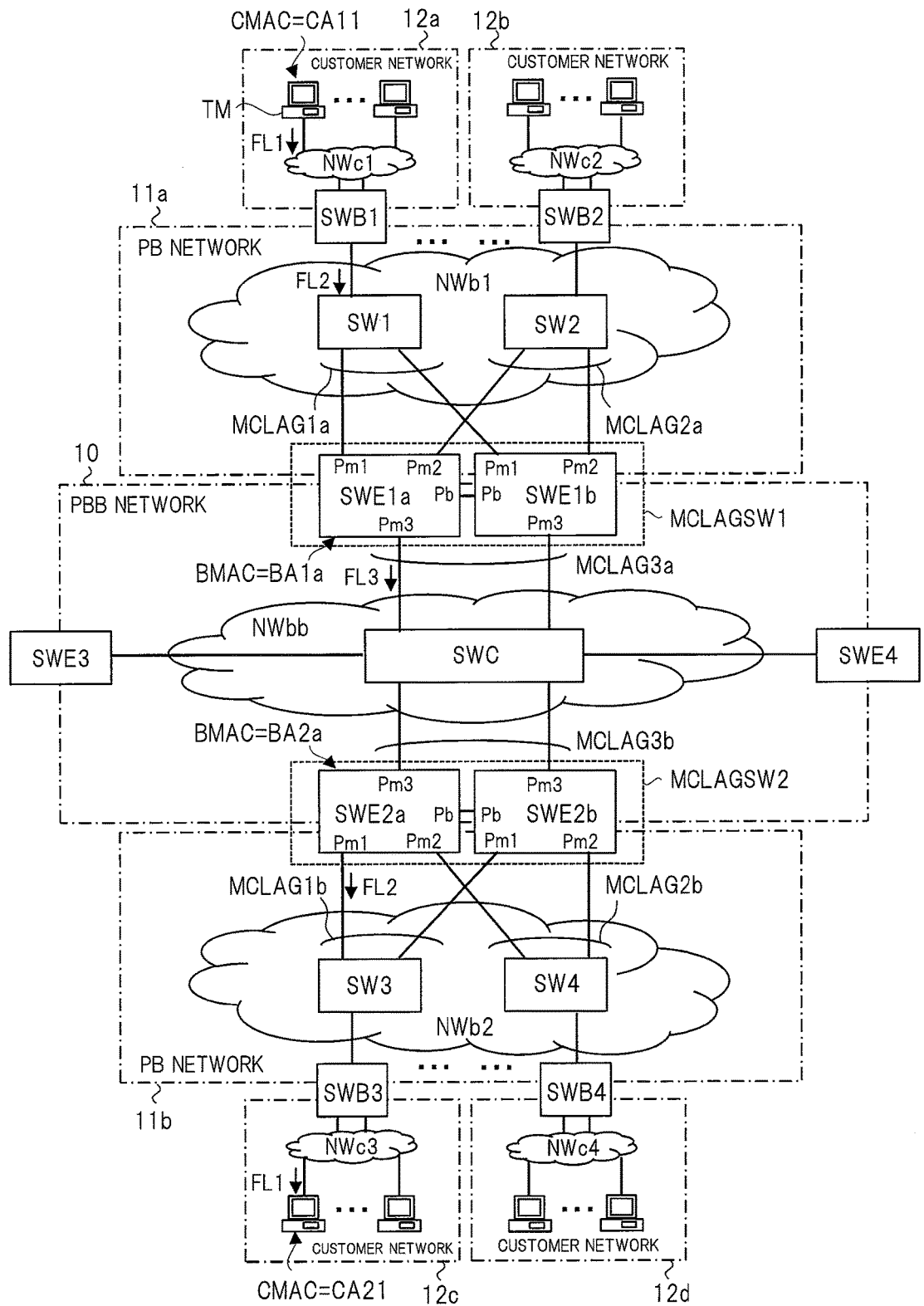
FIG. 1 is a schematic view showing the overall configuration example of a relay system according to the first embodiment of the present invention.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference characters throughout the drawings for describing the embodiments, and the repetitive description thereof will be omitted.

(First Embodiment)

《Overall Configuration of Relay System》

FIG. 1 is a schematic view showing the overall configuration example of a relay system according to the first embodiment of the preset invention. In the relay system shown in FIG. 1, a plurality of (four in this case) customer networks 12a to 12d, a plurality of (two in this case) PB networks 11a and 11b for the relay between the customer networks 12a to 12d and a PBB network 10 for the relay between the PB networks 11a and 11b are provided. The PB network 11a manages the relay between the customer networks 12a and 12b, and the PB network 11b manages the relay between the customer networks 12c and 12d. The PBB network 10 is a relay network in which the relay based on IEEE 802.1ah (in other words, PBB standard) is carried out. The PB networks 11a and 11b are relay networks to which the aforementioned extended VLAN is applied.

At boundary portions between the customer networks 12a and 12b and the PB network 11a, switches SWB1 and SWB2 are respectively provided. The customer network 12a is provided with a plurality of customer terminals TM and a network NWc1 for connecting these terminals to the switch SWB1. The customer network 12b is provided with a plurality of customer terminals TM and a network NWc2 for connecting these terminals to the switch SWB2. Each of the networks NWc1 and NWc2 is constituted of communication lines, switches and others (not shown). The switch SWB1 manages the relays among the plurality of customer terminals TM within the customer network 12a, and manages also the relays between each customer terminal TM and the PB network 11a. The switch SWB2 manages the relays among the plurality of customer terminals TM within the customer network 12b, and manages also the relays between each customer terminal TM and the PB network 11a.

In the same manner, at boundary portions between the customer networks 12c and 12d and the PB network 11b, switches SWB3 and SWB4 are respectively provided. Each of the customer networks 12c and 12d is provided with a plurality of customer terminals TM and network NWc3 or NWc4. The switches SWB3 and SWB4 respectively manage the relays among the plurality of customer terminals TM within the customer networks 12c and 12d, and manage also the relays between each customer terminal TM and the PB network 11b.

At a boundary portion between the PB network 11a and the PBB network 10 (in other words, an entrance or an exit of the PBB network 10), an MCLAG switch MCLAGSW1 constituted of two switching devices (edge switching devices) SWE1a and SWE1b is provided. Each of the switching devices SWE1a and SWE1b has an upper-link port and a lower-link port. In this example, MCLAG ports Pm1 and Pm2 are included in the lower-link port, and an MCLAG port Pm3 and a bridge port Pb are included in the upper-link port.

Each of the switching devices SWE1a and SWE1b sets a common MCLAG1a at its own MCLAG port Pm1 and the MCLAG port Pm1 of the peer device, and sets common MCLAG2a and MCLAG3a respectively at its own MCLAG ports Pm2 and Pm3 and the MCLAG ports Pm2 and Pm3 of the peer device. The PB network 11a is provided with a network NWb1 constituted of communication lines, switches and others. In this example, the network NWb1 includes switches SW1 and SW2.

The switches SWB1 and SWB2 are connected to any of the plurality of lower-link ports of the MCLAG switch MCLAGSW1 appropriately through the network NWb1. In this example, the switch SWB1 is connected to the MCLAG ports Pm1 of the switching devices SWE1a and SWE1b through the switch SW1, and the switch SWB2 is connected to the MCLAG ports Pm2 of the switching devices SWE1a and SWE1b through the switch SW2. Thus, the MCLAG switch MCLAGSW1 manages the relays between the plurality of switches SWB1 and SWB2 located in the lower link of its own device, and manages also the relays between the respective switches SWB1 and SWB2 and the PBB network 10.

In the same manner as the case of the MCLAG switch MCLAGSW1, an MCLAG switch MCLAGSW2 constituted of two switching devices (edge switching devices) SWE2a and SWE2b is provided at a boundary portion between the PB network 11b and the PBB network 10. Each of the switching devices SWE2a and SWE2b has a lower-link port and an upper-link port. In this example, MCLAG ports Pm1 and Pm2 are included in the lower-link port, and an MCLAG port Pm3 and a bridge port Pb are included in the upper-link port.

Each of the switching devices SWE2a and SWE2b sets a common MCLAG1b at its own MCLAG port Pm1 and the MCLAG port Pm1 of the peer device, and sets common MCLAG2b and MCLAG3b respectively at its own MCLAG ports Pm2 and Pm3 and the MCLAG ports Pm2 and Pm3 of the peer device. The PB network 11b is provided with a network NWb2. In this example, the network NWb2 includes switches SW3 and SW4.

The switches SWB3 and SWB4 are connected to any of the plurality of lower-link ports of the MCLAG switch MCLAGSW2 appropriately through the network NWb2. In this example, the switch SWB3 is connected to the MCLAG ports Pm1 of the switching devices SWE2a and SWE2b through the switch SW3, and the switch SWB4 is connected to the MCLAG ports Pm2 of the switching devices SWE2a and SWE2b through the switch SW4. Thus, the MCLAG switch MCLAGSW2 manages the relays between the plurality of switches SWB3 and SWB4 located in the lower link of its own device, and manages also the relays between the respective switches SWB3 and SWB4 and the PBB network 10.

Moreover, switching devices (edge switching devices) SWE3 and SWE4 are provided at boundary portions between the PB networks and the PBB network 10. Illustrations of the switching devices SWE3 and SWE4 are omitted, but they have a lower-link port and an upper-link port like the MCLAG switch MCLAGSW1 and others, and a PB network and a customer network are provided in the lower link. Although the switching devices SWE3 and SWE4 in this case are respectively prepared as switching devices on which no MCLAG is set, they may be MCLAG switches.

The PBB network 10 is provided with a network (core network) NWbb constituted of communication lines, switches and others. The MCLAG switches MCLAGSW1 and MCLAGSW2 and the switching devices SWE3 and SWE4 are connected to one another through the network NWbb. In this example, the network NWbb includes a core switch SWC. The core switch SWC is connected to the respective MCLAG ports Pm3 of the MCLAG switches MCLAGSW1 and MCLAGSW2 and the respective upper-link ports of the switching devices SWE3 and SWE4.

Note that an example in which an MCLAG switch is logically considered as one edge switching device and four edge switching devices are provided at boundary portions of the PBB network 10 is shown here, but it is enough if at least two or more edge switching devices are provided. Moreover, it is only necessary that at least one edge switching device among these is the MCLAG switch. Furthermore, two switches SWB1 and SWB2 are provided at the boundary portion of the PB network 11a (the same is true for the PB network 11b) in this case, but more switches are provided in practice. In accordance with this, more customer networks are housed in the PB network 11a (the same is true for the PB network 11b) in addition to the two customer networks 12a and 12b.

Furthermore, in this case, the switches SWB1 and SWB2 and the MCLAG switch MCLAGSW1 are connected to each other on one stage through the two switches SW1 and SW2, and the MCLAG switch MCLAGSW1 and the MCLAG switch MCLAGSW2 are connected to each other on one stage through the one core switch SWC for simplicity of explanation. However, in practice, the networks NWb1 and NWb2 and the network (core network) NWbb have more switches and core switches, and the respective relay networks are connected to one another through switches (core switches) of a plurality of stages.

《Frame Configuration in Relay System》

Figure 2:
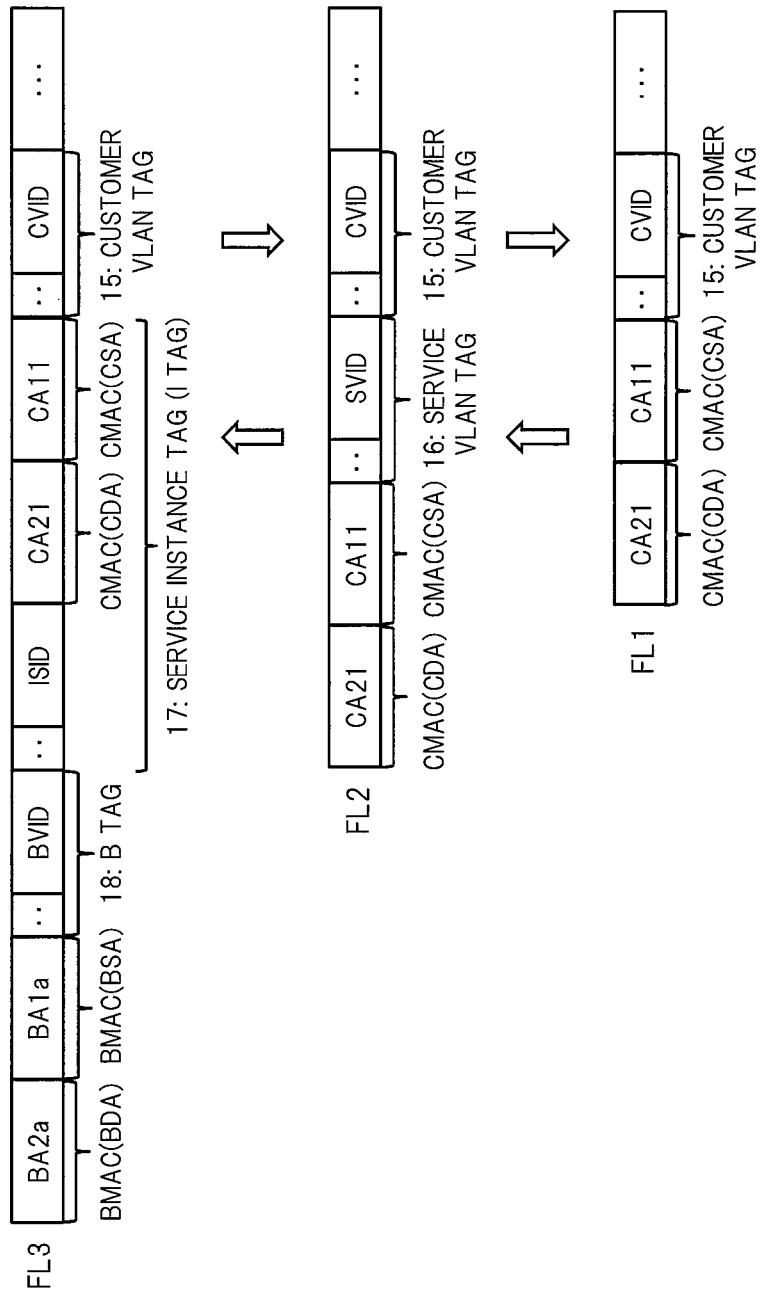
FIG. 2 is a view showing a configuration example of a main portion of a frame flowing through each of relay networks in the relay system of FIG. 1.

FIG. 2 is a view showing a configuration example of a main portion of a frame flowing through each of relay networks in the relay system of FIG. 1. Here, the case in which a frame is transferred from a customer terminal TM inside the customer network 12a to a customer terminal TM inside the customer network 12c is taken as an example. In this case, a customer address (MAC address) CMAC of the customer terminal TM inside the customer network 12a is "CA11" and a customer address CMAC of the customer terminal TM inside the customer network 12c is "CA21". Moreover, an encapsulation address (MAC address) BMAC of the switching device SWE1a is "BA1a" and an encapsulation address BMAC of the switching device SWE2a is "BA2a".

As shown in FIG. 1 and FIG. 2, first, the customer terminal TM of the transmission source transmits a frame FL1 into the customer network 12a. The frame FL1 inside the customer network 12a is an unencapsulated frame containing a customer VLAN tag 15, a source customer address CMAC (CSA) and a destination customer address CMAC (CDA). In this case, the source customer address CSA is the MAC address "CA11", and the destination customer address CDA is the MAC address "CA21". The customer VLAN tag 15 contains a customer VLAN identifier CVID arbitrarily set by a customer.

Next, as shown in FIG. 1, the switch SWB1 receives the frame FL1, and transmits a frame FL2 into the PB network 11a. The frame FL2 is an extended VLAN frame, and corresponds to an unencapsulated frame formed by adding a service VLAN tag 16 to the frame FL1 as shown in FIG. 2. The service VLAN (extended VLAN) tag 16 contains a service VLAN identifier SVID arbitrarily set by the service provider or the like. A broadcast domain inside the PB network 11a is determined by this service VLAN identifier SVID. The switch SWB1 adds the service VLAN tag 16 to the frame FL1 based on the setting of the service provider or the like.

Next, as shown in FIG. 1, the switching device SWE1a receives the frame FL2 and transmits a frame FL3 into the PBB network 10. The frame FL3 is a PBB frame and is an encapsulated frame. The encapsulated frame schematically has a configuration in which an encapsulation address is added to an unencapsulated frame based on the PBB standard. More specifically, as shown in FIG. 2, the frame FL3 has a configuration in which the frame FL2 is encapsulated by a service instance identifier ISID, a backbone VLAN tag (B tag) 18, a source encapsulation address BMAC (BSA) and a destination encapsulation address BMAC (BDA).

The service instance identifier ISID is contained in a service instance tag (I tag) 17 with the inclusion of the above-mentioned source customer address CSA and destination customer address CDA.

The service instance identifier ISID is an identifier for identifying a customer and has a 24-bit region. This 24-bit region makes it possible to further extend a 12-bit service VLAN identifier SVID. The service instance identifier ISID is arbitrarily set by a service provider or the like. As a typical setting method, for example, a method of associating one service VLAN identifier SVID with one service instance identifier ISID or a method of associating a plurality of service VLAN identifiers SVID with one service instance identifier ISID has been known.

The backbone VLAN tag (B tag) 18 contains a backbone VLAN identifier BVID. The backbone VLAN identifier BVID is an identifier for controlling relay paths and has a 12-bit region. The broadcast domain in the PBB network 10 is determined by the backbone VLAN identifier BVID. The backbone VLAN identifier BVID is set by a service provider or the like. As a typical setting method, for example, a method of associating a plurality of service instance identifiers ISID with one backbone VLAN identifier BVID has been known.

As indicated by the frame FL3 of FIG. 2, the switching device SWE1a encapsulates the frame FL2 by setting its own MAC address "BA1a" as the source encapsulation address BSA and setting the MAC address "BA2a" of the switching device SWE2a as the destination encapsulation address BDA in this case. Then, the switching device SWE1a transmits the frame FL3 formed into the encapsulated frame to the switching device SWE2a from an MCLAG port (upper-link port) Pm3.

The switching device SWE2a receives the frame (encapsulated frame) FL3. Since the destination encapsulation address BDA "BA2a" of the frame FL3 corresponds to the switching device SWE2a itself, the switching device SWE2a converts the frame (encapsulated frame) FL3 into a frame (unencapsulated frame) FL2 as shown in FIG. 1 and FIG. 2. Then, the switching device SWE2a transmits the frame FL2 to the switch SWB3 from the MCLAG port (lower-link port) Pm1 through the PB network 11b.

The switch SWB3 receives the frame FL2, and converts it into the frame FL1 by removing the service VLAN tag 16 from the frame FL2. Moreover, the switch SWB3 transmits the frame FL1 to a customer terminal TM having a customer address CMAC "CA21" through the customer network 12c.

Note that, although the MCLAG switches MCLAGSW1 and MCLAGSW2 transmit or receive the frame FL2 between the PB networks 11a and 11b in the examples of FIG. 1 and FIG. 2, they can transmit or receive the frame FL1 between the customer networks 12a and 12c depending on cases. Namely, the edge switching device can generate the frame FL3 by encapsulating the frame FL1 of FIG. 2, and can also generate the frame FL1 by decapsulating the frame FL3. Moreover, although the configuration based on the PBB standard has been described here, the configuration can be applied also to the EoE (Ethernet over Ethernet) standard in the same manner. An EoE frame is slightly different from the PBB frame (frame FL3) of FIG. 2 in a format, but it has substantially the same information as that of the PBB frame of FIG. 2, and its relay system is also configured in the same manner as the case of FIG. 1.

«Configuration of Main Part of Relay System»

Figure 3:
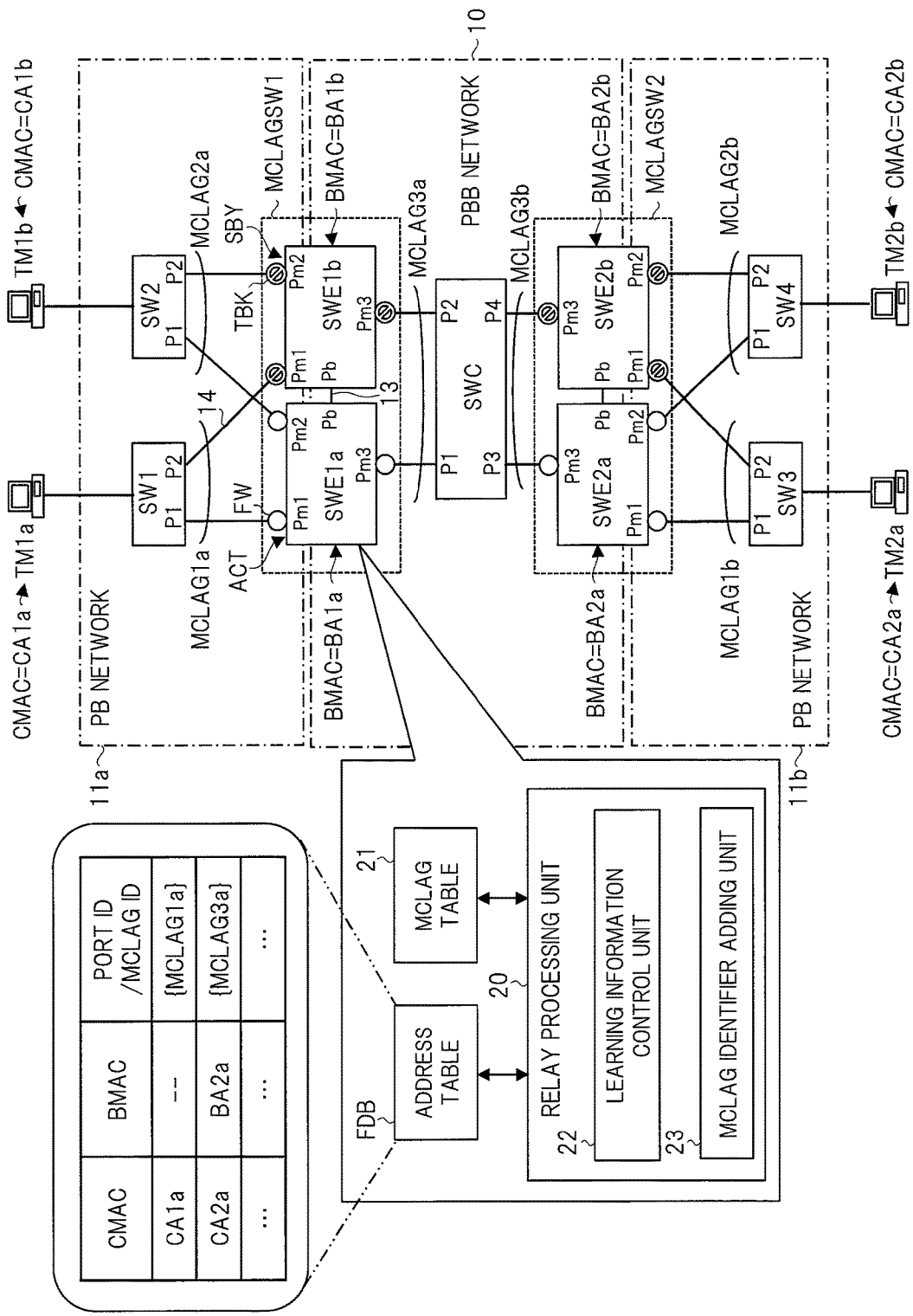
FIG. 3 is a schematic view showing a configuration example around an MCLAG switch in the relay system of FIG. 1.

FIG. 3 is a schematic view showing a configuration example around an MCLAG switch in the relay system of FIG. 1. As described in FIG. 1, the MCLAG switch MCLAGSW1 is made up of two switching devices SWE1a and SWE1b, and the MCLAG switch MCLAGSW2 is made up of two switching devices SWE2a and SWE2b. The encapsulation addresses (MAC addresses) of the switching devices SWE1a, SWE1b, SWE2a and SWE2b are BA1a, BA1b, BA2a and BA2b, respectively.

Each of the MCLAG switches MCLAGSW1 and MCLAGSW2 converts the unencapsulated frame received from the outside of the PBB network 10 (in this case, PB networks 11a and 11b) into an encapsulated frame and relays it to the PBB network 10. On the contrary, each of the MCLAG switches MCLAGSW1 and MCLAGSW2 converts the encapsulated frame received from the PBB network 10 into an unencapsulated frame and relays it to the outside of the PBB network (PB networks 11a and 11b). Moreover, the MCLAG switches MCLAGSW1 and MCLAGSW2 respectively carry out the relay of unencapsulated frames inside the PB networks 11a and 11b and the relay of encapsulated frames inside the PBB network 10.

Each of the switching devices SWE1a and SWE1b (the same is true for the switching devices SWE2a and SWE2b) is provided with a lower-link port for transmitting or receiving an unencapsulated frame and an upper-link port for transmitting or receiving an encapsulated frame. As described in FIG. 1, the lower-link port includes the MCLAG ports Pm1 and Pm2, and the upper-link port includes the MCLAG port Pm3 and the bridge port Pb.

The bridge ports Pb connect one device and the peer device thereof through a communication line 13. The communication line 13 is provided as, for example, an Ethernet (registered trademark) line or provided as a dedicated line. Although the upper-link port and the lower-link port are constituted of MCLAG ports except for the bridge port Pb, the present invention is not limited thereto. As long as the MCLAG port (first MCLAG port (for example, Pm1)) serving as the lower-link port is provided, the other ports may be either the MCLAG ports or ports on which no MCLAG is set.

Moreover, each of the switches SW1 and SW2 inside the PB network 11a has LAG ports P1 and P2. The LAG port P1 of the switch SW1 is connected to the MCLAG port Pm1 of the switching device SWE1a through a communication line 14, and the LAG port P2 is connected to the MCLAG port Pm1 of the switching device SWE1b through the communication line 14. The LAG port P1 of the switch SW2 is connected to the MCLAG port Pm2 of the switching device SWE1a through the communication line 14, and the LAG port P2 is connected to the MCLAG port Pm2 of the switching device SWE1b through the communication line 14. The communication line 14 is provided as, for example, an Ethernet line.

The switch SW1 sets an MCLAG1a on the LAG ports P1 and P2, and the switch SW2 sets an MCLAG2a on the LAG ports P1 and P2. In practice, it is only necessary for each of the switches SW1 and SW2 to set an ordinary LAG on the LAG ports P1 and P2, and there is no need for particularly distinguishing the LAG and the MCLAG.

Similarly, each of the switches SW3 and SW4 inside the PB network 11b also has LAG ports P1 and P2. The LAG ports P1 and P2 of the switch SW3 are respectively connected to the MCLAG ports Pm1 of the switching devices SWE2a and SWE2b through the communication line 14, and the LAG ports P1 and P2 of the switch SW4 are respectively connected to the MCLAG ports Pm2 of the switching devices SWE2a and SWE2b through the communication line 14. The switch SW3 sets an MCLAG1b (actually, an ordinary LAG) on the LAG ports P1 and P2, and the switch SW4 sets an MCLAG2b on the LAG ports P1 and P2.

The core switch SWC inside the PBB network 10 has LAG ports P1 to P4. The LAG ports P1 and P2 are respectively connected to the MCLAG ports Pm3 of the switching devices SWE1a and SWE1b through the communication line 14, and the LAG ports P3 and P4 are respectively connected to the MCLAG ports Pm3 of the switching devices SWE2a and SWE2b through the communication line 14. The core switch SWC sets an MCLAG3a (actually, an ordinary LAG) on the LAG ports P1 and P2, and sets an MCLAG3b on the LAG ports P3 and P4. Although not shown in the drawings, the core switch SWC further has ports connected to the switching devices SWE3 and SWE4 of FIG. 1.

Moreover, FIG. 3 shows customer terminals TM1a, TM1b, TM2a and TM2b. In this case, the customer addresses (MAC addresses) CMAC of the customer terminals TM1a, TM1b, TM2a and TM2b are respectively CA1a, CA1b, CA2a and CA2b. The customer terminals TM1a and TM1b are included in the customer networks 12a and 12b of FIG. 1, and the customer terminals TM2a and TM2b are included in the customer networks 12c and 12d. The customer terminals TM1a and TM1b are respectively connected to the switches SW1 and SW2, and the customer terminals TM2a and TM2b are respectively connected to the switches SW3 and SW4. Note that illustrations of the networks (NWc1 to NWc4) and the switches (SWB1 to SWB4) of the respective customer networks are omitted in FIG. 3 for the sake of convenience.

In this configuration, FIG. 3 shows a method in which an active ACT or a standby SBY is set to MCLAG ports serving as member ports of each MCLAG as an example of an operation method of the MCLAG switches MCLAGSW1 and MCLAGSW2. In this example, in the MCLAG1a, the MCLAG port Pm1 of the switching device SWE1a is set to active ACT, and the MCLAG port Pm1 of the switching device SWE1b is set to standby SBY.

Similarly, also in the MCLAG2a and the MCLAG3a, the MCLAG ports Pm2 and Pm3 of the switching device SWE1a are set to active ACT, and the MCLAG ports Pm2 and Pm3 of the switching device SWE1b are set to standby SBY. Furthermore, the same is true for the MCLAG1b, MCLAG2b and MCLAG3b, and the MCLAG ports Pm1, Pm2 and Pm3 of the switching device SWE2a are set to active ACT, and the MCLAG ports Pm1, Pm2 and Pm3 of the switching device SWE2b are set to standby SBY.

When there is no fault, the MCLAG port set to active ACT is controlled to a transmission/reception permitted state FW in which transmission and reception are permitted. On the other hand, the MCLAG port set to standby SBY is controlled to a transmission prohibited state TBK in which transmission is prohibited and reception is permitted. As a result, the frame from the MCLAG switch MCLAGSW1 to the switch SW1 is always transmitted from the MCLAG port Pm1 of the switching device SWE1a. Similarly, the frame from the MCLAG switch MCLAGSW1 to the core switch SWC is always transmitted from the MCLAG port Pm3 of the switching device SWE1a. On the other hand, the frame from the switch SW1 or the core switch SWC to the MCLAG switch MCLAGSW1 is transmitted from both of the LAG ports P1 and P2.

In this case, when a fault occurs at, for example, the MCLAG port Pm1 of the switching device SWE1a, the switching operation in the occurrence of fault is performed in the MCLAG switch MCLAGSW1. Specifically, in the MCLAG1a, the MCLAG port Pm1 of the switching device SWE1b is controlled to the transmission/reception permitted state FW, and the MCLAG port Pm1 of the switching device SWE1a is controlled to, for example, a transmission/reception prohibited state in which transmission and reception are both prohibited.

Note that the operation method of the MCLAG switch is not limited to this method, and various methods can be used. For example, a method in which a switching device on the side of receiving a frame transmits the frame from its own MCLAG port in principle can be used. More specifically, in the case where the switching device SWE1a receives a frame directed from the PB network 11a to the PBB network 10, the switching device SWE1a transmits the frame from its own MCLAG port Pm3, and in the case where the switching device SWE1b receives the frame, the switching device SWE1b transmits the frame from its own MCLAG port Pm3.

Alternatively, a method in which MCLAG ports to transmit frames are equally distributed to the two switching devices SWE1a and SWE1b based on distribution ID and the like can also be used. More specifically, as long as both of two switching devices (for example, SWE1a and SWE1b) constituting the MCLAG switch can receive an unencapsulated frame at the MCLAG port (first MCLAG port (for example, Pm1)) serving as a lower-link port, the operation method of the MCLAG switch is not particularly limited.

Moreover, FIG. 3 shows a schematic configuration example of main parts of the respective switching devices SWE1a and SWE1b and the switching devices SWE2a and SWE2b. In this case, the switching devices SWE1a and SWE1b are described as typical examples. Each of the switching devices SWE1a and SWE1b has an address table FDB, an MCLAG table 21 and a relay processing unit 20. The relay processing unit 20 mainly executes learning and retrieval of the address table FDB.

The MCLAG table 21 retains one or a plurality of MCLAG ports in association with one or a plurality of MCLAG identifiers, respectively. In the example of FIG. 3, the MCLAG tables 21 of the switching devices SWE1a and SWE1b retain the MCLAG ports Pm1, Pm2 and Pm3 in association with MCLAG identifiers {MCLAG1a}, {MCLAG2a} and {MCLAG3a}, respectively. In this specification, for example, {AA} is supposed to represent an identifier (ID) of "AA".

By this MCLAG table 21, each of the switching devices SWE1a and SWE1b sets a common MCLAG1a on its own MCLAG port Pm1 and the MCLAG port Pm1 of the peer device. In the same manner, each of the switching devices SWE1a and SWE1b sets common MCLAG2a and MCLAG3a to it own MCLAG ports Pm2 and Pm3 and the MCLAG ports Pm2 and Pm3 of the peer device.

The address table FDB retains the customer address present ahead of a lower-link port in association with the port identifier representing the lower-link port or the MCLAG identifier corresponding to the lower-link port. For example, in the example of FIG. 3, the address table FDB of the switching device SWE1a retains the customer address CMAC "CA1a" present ahead of the MCLAG port (lower-link port) Pm1 in association with the MCLAG identifier {MCLAG1a}. As described above, in the case where a port on which no MCLAG is set is included in the lower-link port, a port identifier is used in place of the MCLAG identifier.

Also, the address table FDB retains the customer address present ahead of the upper-link port in association with the encapsulation address and the port identifier representing the upper-link port or the MCLAG identifier corresponding to the upper-link port. For example, in the example of FIG. 3, the address table FDB of the switching device SWE1a retains the customer address CMAC "CA2a" present ahead of the MCLAG port (upper-link port) Pm3 in association with the encapsulation address BMAC "BA2a" and the MCLAG identifier {MCLAG3a}.

The relay processing unit 20 is provided with a learning information control unit 22 and an MCLAG identifier adding unit 23. When relaying the frame received at the MCLAG port (for example, Pm1) to the bridge port Pb, the MCLAG identifier adding unit 23 adds an MCLAG identifier ({MCLAG1a}) corresponding to the MCLAG port to the frame. Though details thereof will be described later, the learning information control unit 22 controls the information learned to the address table FDB in order to prevent the problem in which the learning information on the address table FDB is unnecessarily altered.

«Operation to be Premise of Main Part of Relay System and Problem Thereof»

Figure 20:
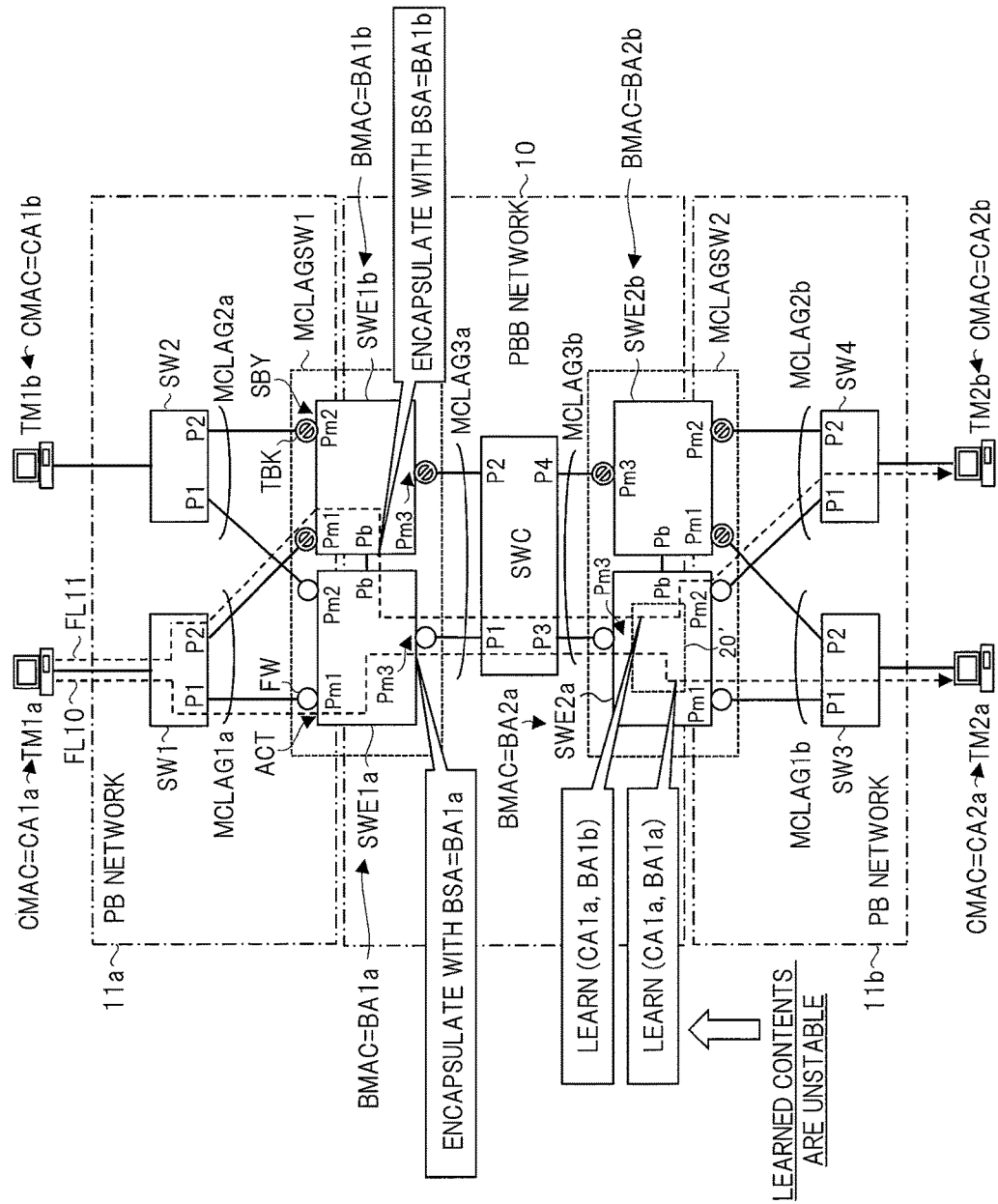
FIG. 20 is an explanatory view showing an operation example and an example of a problem in the case where the relay system of FIG. 3 is not provided with the learning information control unit in a relay system examined as the premise of the present invention.

FIG. 20 is an explanatory view showing an operation example and an example of a problem in the case where the relay system of FIG. 3 is not provided with the learning information control unit in a relay system examined as the premise of the present invention. First, the case where a frame FL10 is transferred from a customer terminal TM1a to a customer terminal TM2a is assumed. The switch SW1 receives the frame (in this case, unencapsulated frame) FL10, and relays the frame FL10 to either one of the LAG ports P1 and P2 based on a predetermined distribution rule. Although not particularly limited, hash operations and the like having the source customer address CSA and the destination customer address CDA as inputs are used for the predetermined distribution rule. In this case, the frame FL10 is supposed to be relayed to the LAG port P1.

The switching device SWE1a receives the frame (in this case, unencapsulated frame) FL10 at the MCLAG port Pm1. Then, the switching device SWE1a (more specifically, the relay processing unit 20) learns the source customer address CSA "CA1a" contained in the frame (unencapsulated frame) FL10 to the address table FDB in association with a reception port identifier. The reception port identifier represents a port identifier of the port that has received the frame or an MCLAG identifier that is associated with the corresponding port. In this case, the reception port identifier is an MCLAG identifier {MCLAG1a}.

Moreover, the switching device SWE1a (more specifically, the relay processing unit 20) retrieves the address table FDB by using the destination customer address CDA "CA2a" contained in the frame (unencapsulated frame) FL10 as a retrieval key. The switching device SWE1a is assumed to acquire an encapsulation address BMAC "BA2a" and an MCLAG identifier {MCLAG3a} serving as a destination port identifier as a result of the retrieval. The destination port identifier represents a port identifier or an MCLAG identifier acquired by the retrieval of the address table FDB.

Since the MCLAG port Pm3 of the switching device SWE1a serving as a member port of the MCLAG3a is controlled to the transmission/reception permitted state FW, the switching device SWE1a (more specifically, relay processing unit 20) determines a port identifier {Pm3} of its own MCLAG port Pm3 as the transmission port identifier of the frame FL10. If the MCLAG port Pm3 of the device is controlled to the transmission prohibited state TBK, the port identifier {Pb} of the bridge port Pb is determined as the transmission port identifier.

The transmission port identifier means a port identifier of a port that actually transmits the frame. For example, in the case where the destination port identifier is not an MCLAG identifier, but a port identifier of a port on which no MCLAG is set, the transmission identifier is equal to the destination port identifier. On the other hand, in the case where the destination port identifier is an MCLAG identifier, the transmission port identifier is a port identifier ({Pm3}) of an MCLAG port (for example, Pm3) or a port identifier {Pb} of the bridge port Pb in accordance with the control state of the MCLAG port.

In this case, the transmission port identifier is the port identifier {Pm3} of the MCLAG port Pm3 serving as the upper-link port. Therefore, the switching device SWE1a encapsulates the frame (unencapsulated frame) FL10 by using the source encapsulation address BSA (encapsulation address BMAC "BA1a" of the switching device SWE1a itself) and the destination encapsulation address BDA (encapsulation address BMAC "BA2a" based on the address table FDB). Then, the switching device SWE1a transmits the corresponding frame (encapsulated frame) FL10 from the MCLAG port Pm3.

The core switch SWC receives the corresponding frame (encapsulated frame) FL10, learns the source encapsulation address BSA "BA1a" contained in the corresponding frame to the address table, and also retrieves the address table by using the destination encapsulation address BDA "BA2a" as a retrieval key. In this case, the core switch SWC is assumed to acquire an MCLAG identifier (actually, LAG identifier) {MCLAG3b} based on the result of the retrieval of the address table and select the LAG port P3 based on a predetermined distribution rule.

Thus, the switching device SWE2a receives the frame (encapsulated frame) FL10 at the MCLAG port Pm3. The switching device SWE2a (more specifically, relay processing unit 20) learns the source customer address CSA "CA1a" of the frame FL10 to the address table FDB in association with the source encapsulation address BSA "BS1a" and the reception port identifier (in this case, MCLAG identifier {MCLAG3b}).

Moreover, since the destination encapsulation address BDA "BA2a" of the frame FL10 is directed to the switching device SWE2a itself, the switching device SWE2a (more specifically, relay processing unit 20) retrieves the address table FDB by using the destination customer address CDA "CA2a" of the frame FL10 as a retrieval key. The switching device SWE2a is assumed to acquire an MCLAG identifier {MCLAG1b} as a destination port identifier as a result of the retrieval.

Since the MCLAG port Pm1 of the switching device SWE2a itself corresponding to the MCLAG identifier {MCLAG1b} is controlled to the transmission/reception permitted state FW and is also the lower-link port, the switching device SWE2a (more specifically, relay processing unit 20) converts the corresponding frame (encapsulated frame) FL10 into an unencapsulated frame, and then relays the frame to the MCLAG port Pm1. As a result, the frame (unencapsulated frame) FL10 reaches the customer terminal TM2a through the switch SW3.

Next, the case where a frame F11 is transferred from a customer terminal TM1a to a customer terminal TM2b is assumed. The switch SW1 receives the frame (unencapsulated frame) F11, and relays the frame FL11 to either one of the LAG ports P1 and P2 (in this case, LAG port P2) based on a predetermined distribution rule. The switching device SWE1b receives the frame FL11 at the MCLAG port Pm1. Then, the switching device SWE1b learns the source customer address CSA "CA1a" contained in the frame (unencapsulated frame) FL11 to the address table FDB in association with an MCLAG identifier {MCLAG1a} serving as a reception port identifier.

Moreover, the switching device SWE1b retrieves the address table FDB by using the destination customer address CDA "CA2b" contained in the frame FL11 as a retrieval key. The switching device SWE1b is assumed to acquire an encapsulation address BMAC "BA2a" and an MCLAG identifier {MCLAG3a} serving as a destination port identifier as a result of the retrieval. Since the MCLAG port Pm3 of the switching device SWE1a serving as a member port of the MCLAG3a is controlled to the transmission prohibited state TBK, the switching device SWE1b (more specifically, relay processing unit 20) determines a port identifier {Pb} as the transmission port identifier of the frame FL11.

Since the bridge port Pb is the upper-link port, the switching device SWE1b encapsulates the frame (unencapsulated frame) FL11 by using the source encapsulation address BSA (encapsulation address BMAC "BA1b" of the switching device SWE1b itself) and the destination encapsulation address BDA (encapsulation address BMAC "BA2a"). Moreover, when relaying a frame received at the MCLAG port Pm1 to the bridge port Pb, the switching device SWE1b (more specifically, MCLAG identifier adding unit 23) adds an MCLAG identifier {MCLAG1a} corresponding to a reception port identifier to the frame.

Thus, the switching device SWE1b transmits the frame (encapsulated frame) FL11 to which the MCLAG identifier {MCLAG1a} is added from the bridge port Pb. On the other hand, the switching device SWE1a receives the frame (encapsulated frame) FL11 at the bridge port Pb. Then, the switching device SWE1a learns the source customer address CSA "CA1a" contained in the frame FL11 to the address table FDB in association with the MCLAG identifier {MCLAG1a} added to the frame FL11.

Moreover, the switching device SWE1a retrieves the address table FDB by using the destination encapsulation address BDA "BA2a" contained in the frame (encapsulated frame) FL11 as a retrieval key. The switching device SWE1a is assumed to acquire an MCLAG identifier {MCLAG3a} serving as the destination port identifier as a result of the retrieval. Since the MCLAG port Pm3 of the switching device SWE1a serving as the member port of the MCLAG3a is controlled to the transmission/reception permitted state FW, the switching device SWE1a determines the port identifier {Pm3} of the MCLAG port Pm3 of the switching device SWE1a itself as the transmission port identifier of the frame FL11. Then, the switching device SWE1a transmits the frame FL11 from the MCLAG port Pm3.

The core switch SWC receives the frame (encapsulated frame) FL11, and learns the source encapsulation address BSA "BA1b" contained in the frame to the address table, and also retrieves the address table by using the destination encapsulation address BDA "BA2a" as a retrieval key. In this case, the core switch SWC is assumed to acquire an MCLAG identifier (actually, LAG identifier) {MCLAG3b} based on the result of the retrieval of the address table and select the LAG port P3 based on a predetermined distribution rule.

Thus, the switching device SWE2a receives the frame (encapsulated frame) FL11 at the MCLAG port Pm3. The switching device SWE2a learns the source customer address CSA "CA1*a*" of the frame FL11 to the address table FDB in association with the source encapsulation address BSA "BA1*b*" and the reception port identifier (MCLAG identifier {MCLAG3*b*}).

Moreover, since the destination encapsulation address BDA "BA2*a*" of the frame FL11 is directed to the switching device SWE2*a* itself, the switching device SWE2*a* retrieves the address table FDB by using the destination customer address CDA "CA2*b*" of the frame FL11 as a retrieval key. The switching device SWE2*a* is assumed to acquire an MCLAG identifier {MCLAG2*b*} as a destination port identifier as a result of the retrieval.

Since the MCLAG port Pm2 of the switching device SWE2*a* itself corresponding to the MCLAG identifier {MCLAG2*b*} is controlled to the transmission/reception permitted state FW and is also the lower-link port, the switching device SWE2*a* converts the corresponding frame (encapsulated frame) FL11 into an unencapsulated frame, and then relays the frame to the MCLAG port Pm2. As a result, the frame (unencapsulated frame) FL11 reaches the customer terminal TM2*b* through the switch SW4.

As described above, when encapsulating the unencapsulated frame transmitted from the customer terminal TM1*a* and received at the MCLAG port (first MCLAG port) Pm1 serving as the lower-link port, there are the case in which the MCLAG switch MCLAGSW1 determines "BA1*a*" as the source encapsulation address and the case in which the MCLAG switch MCLAGSW1 determines "BA1*b*" as the source encapsulation address. As a result, in another switching device (edge switching device) SWE2*a* inside the PBB network 10, the learning information of the address table FDB is unnecessarily altered between "BA1*a*" and "BA1*b*" in spite of being intended for the same customer address CMAC "CA1*a*". Therefore, it is desired to prevent such an unstable situation.

Moreover, the switching device is sometimes provided with a function of detecting the frequent alteration of the learning information intended for the same customer address and regarding the alteration as a fault. This function is originally provided for detecting the occurrence of a loop path or the like. On the other hand, since the phenomenon of FIG. 20 is originally not a phenomenon corresponding to a fault, it is desired to prevent the unnecessary fault detections caused by this phenomenon. Note that, although the above-mentioned another switching device (edge switching device) SWE2*a* is the MCLAG switch MCLAGSW2 in this case, the same problem occurs, for example, in the switching devices SWE3, SWE4 and the like of FIG. 1 other than the MCLAG switch.

«Operation of Learning Information Control Unit and Operation of Main Part of Relay System»

Figure 4:
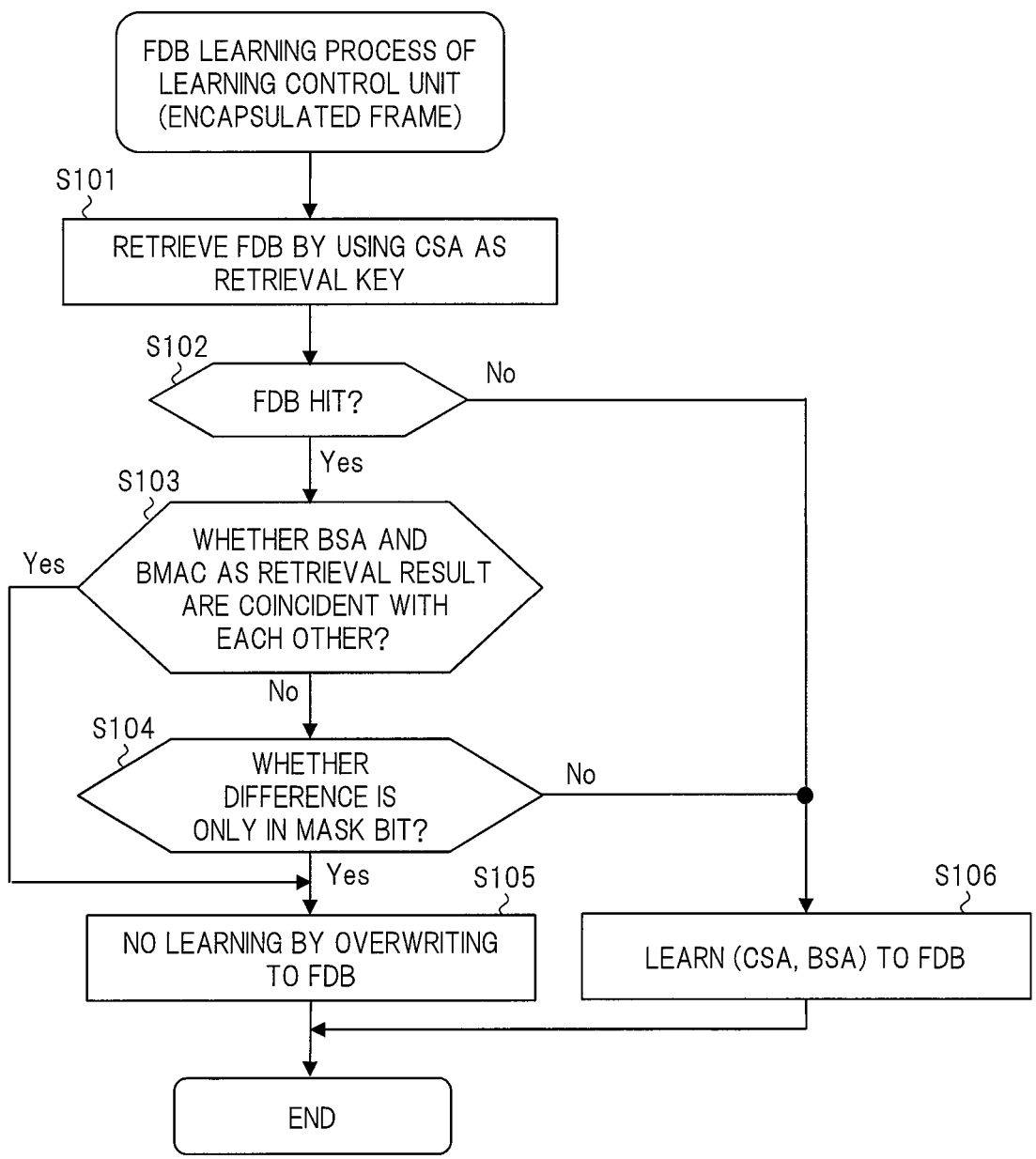
FIG. 4 is a flow diagram showing one example of the processing contents of a learning information control unit in the relay system of FIG. 3.
Figure 5:
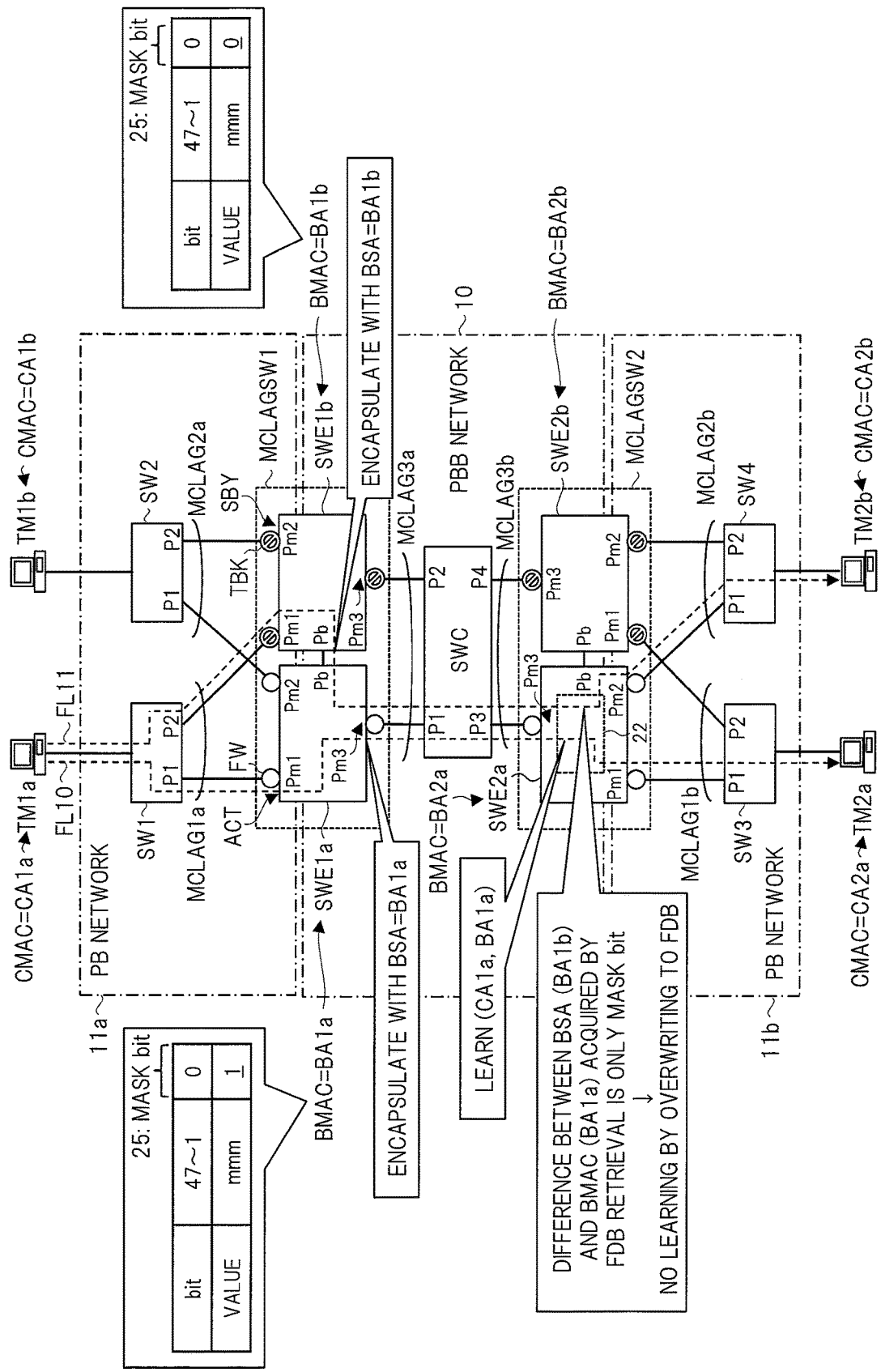
FIG. 5 is an explanatory view showing the operation example of the relay system of FIG. 3.

FIG. 4 is a flow diagram showing one example of processing contents of a learning information control unit in the relay system of FIG. 3. FIG. 5 is an explanatory view showing an operation example of the relay system of FIG. 3. In FIG. 5, in the same manner as the case of FIG. 20 described above, an operation example in which the frame FL10 is first transferred from the customer terminal TM1*a* to the customer terminal TM2*a* and then the frame FL11 is transferred from the customer terminal TM1*a* to the customer terminal TM2*b* is shown. The difference from FIG. 20 will be mainly described here.

In FIG. 5, in the MCLAG switch MCLAGSW1, the encapsulation address BMAC "BA1*a*" of the switching device (first switching device) SWE1*a* is set so as to be different only in a part of bit in comparison with the encapsulation address BMAC "BA1*b*" of the switching device (second switching device) SWE1*b*. In the example of FIG. 5, the encapsulation address BMAC "BA1*a*" has the same values (mmm) from the first bit to the $47^{th}$ bit and only the $0^{th}$ bit is different in comparison with the encapsulation address BMAC "BA1*b*". In this case, the $0^{th}$ bit of the encapsulation address BMAC "BA1*a*" is "1", and the $0^{th}$ bit of the encapsulation address BMAC "BA1*a*" is "0".

In the present specification, this part of bit ($0^{th}$ bit) is referred to as a mask bit 25. The mask bit 25 is not limited to the $0^{th}$ bit and may be positioned at another bit position. In addition, the mask bit 25 is not limited to 1 bit and may have a plurality of bits. Note that the edge switching device normally has a configuration in which the encapsulation address (MAC address) BMAC can be arbitrarily set by the administrator or the like of the device.

On the assumption that the encapsulation address BMAC is set in this manner, for example, the learning information control unit 22 of the switching device (third switching device) SWE2*a* carries out the process as shown in FIG. 4. The learning information control unit 22 carries out a process in which the correspondence relation between the source customer address CSA and the source encapsulation address BSA is not learned to the address table FDB schematically when the following first case and second case are both satisfied.

The first case corresponds to the case in which an encapsulated frame is received at the upper-link port and an encapsulation address BMAC corresponding to the source customer address CSA of the encapsulated frame is acquired from the address table FDB. The second case corresponds to the case in which the difference between the source encapsulation address BSA of the encapsulated frame and the encapsulation address BMAC acquired from the address table FDB lies only in a part of bit (that is, mask bit 25).

More specifically, as shown in FIG. 4, when the learning information control unit 22 receives an encapsulated frame whose destination encapsulation address BDA is directed to its own device, the learning information control unit 22 retrieves the address table FDB by using the source customer address CSA of the frame as a retrieval key (step S101). Then, the learning information control unit 22 determines whether the retrieval result of the address table FDB is hit or mishit (step S102). At this time, when the retrieval result of the address table FDB is hit, the encapsulation address BMAC is acquired.

When the retrieval result of the address table FDB is hit (first case), the learning information control unit 22 determines whether or not the source encapsulation address BSA contained in the frame and the encapsulation address BMAC acquired from the address table FDB are coincident with each other (step S103). In the case where they are not coincident, the learning information control unit 22 determines whether or not the difference is limited only to a part of bit (that is, mask bit 25) (step S104).

Here, when the difference is limited only to the mask bit 25 (second case), the learning information control unit 22 does not learn the correspondence relation between the source customer address CSA and the source encapsulation address BSA to the address table FDB (step S105). In other words, the learning information control unit 22 does not carry out the learning by the overwriting to the entry of the transmission customer address CSA in the address table FDB.

Moreover, also when the source encapsulation address BSA and the encapsulation address BMAC acquired from the address table FDB are coincident with each other in step S103, the learning information control unit 22 needs not to carry out the learning by the overwriting to the address table FDB (step S105). On the other hand, when the retrieval result of the address table FDB is mishit in step S102, the learning information control unit 22 newly learns the correspondence relation between the source customer address CSA and the source encapsulation address BSA to the address table FDB (step S106).

By using the learning information control unit 22 like this, specifically, operations as shown in FIG. 5 are carried out. In FIG. 5, in the same manner as the case of FIG. 20, the switching device SWE2a first receives the frame (encapsulated frame) FL10, and learns the source customer address CSA "CA1a" to the address table FDB in association with the source encapsulation address BSA "BA1a". Alternatively, in the case where the correspondence relation between the customer address CMAC "CA1a" and the encapsulation address BMAC "BA1a" has already been learned, the switching device SWE2a maintains the correspondence relation. Namely, the learning information control unit 22 of the switching device SWE2a carries out the process of steps S102 and S106 or the process of steps S103 to S105 of FIG. 4.

Thereafter, in the same manner as the case of FIG. 20, the switching device SWE2a receives the frame (encapsulated frame) FL11. The source customer address CSA of the frame FL11 is the "CA1a" that has been learned on the address table FDB, and the source encapsulation address BSA is "BA1b" that differs from the learning information (BA1a) of the address table FDB only in the mask bit 25. In this case, the learning information control unit 22 of the switching device SWE2a executes the process of the step S102, step S103, step S104 and step S105 of FIG. 4. As a result, the address table FDB maintains the existing correspondence relation between the customer address CMAC "CA1a" and the encapsulation address BMAC "BA1a".

As described above, by providing the learning information control unit 22, the learning information of the address table FDB in the switching device SWE2a is no longer altered when the frame FL11 is received after receiving the frame 10 unlike the case of FIG. 20. Similarly, the learning information is no longer altered also when the frame FL10 is received after receiving the frame FL11. In this case, the address table FDB maintains the correspondence relation between the customer address CMAC "CA1a" and the encapsulation address BMAC "BA1a". Consequently, it becomes possible to prevent the problem described in FIG. 20 in which the learning information of the address table FDB is unnecessarily altered. Moreover, it is also possible to prevent the unnecessary fault detections described in FIG. 20.

Figure 6:
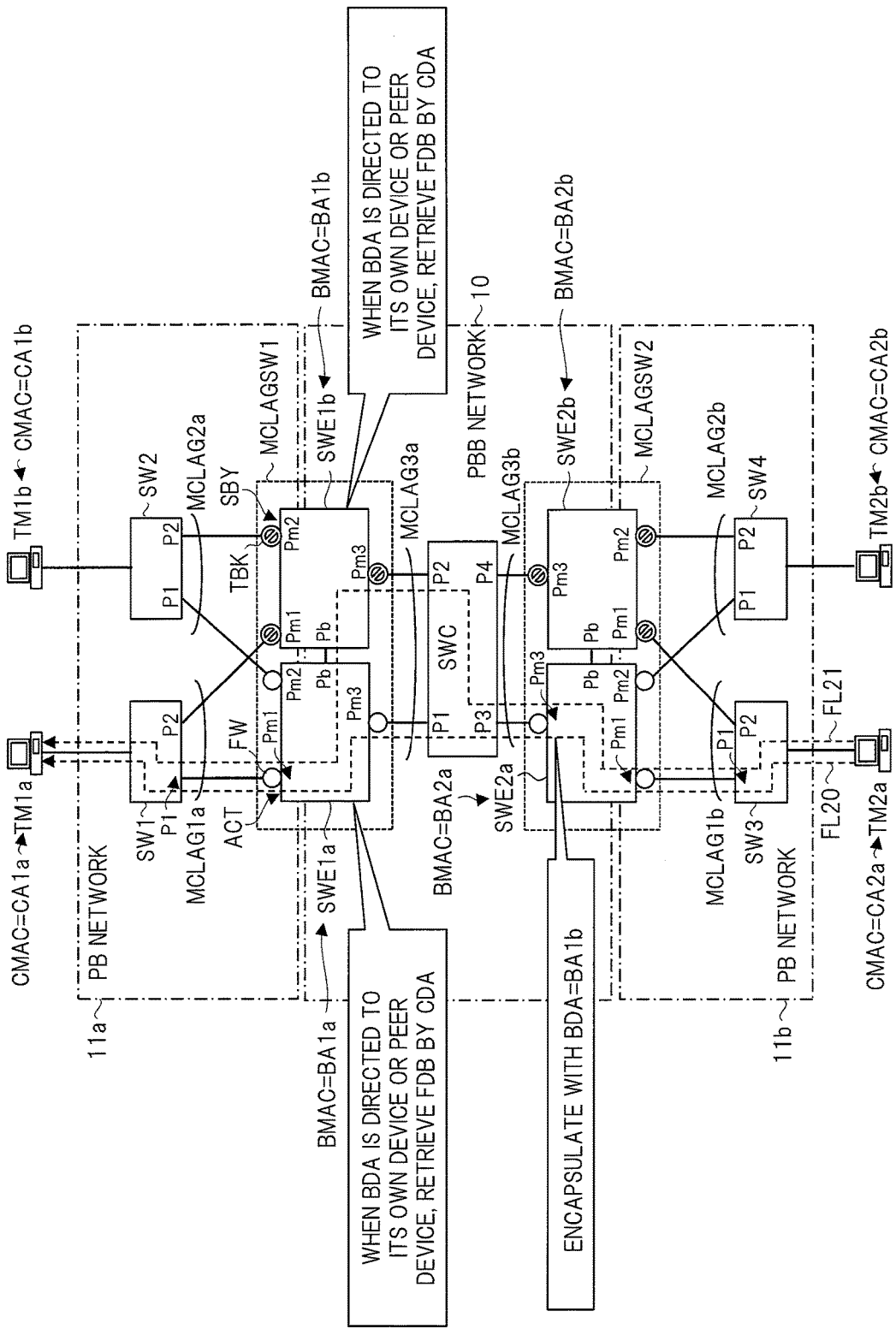
FIG. 6 is an explanatory view showing another operation example of the relay system of FIG. 3.

FIG. 6 is an explanatory view showing another operation example of the relay system of FIG. 3. FIG. 6 shows the operation example in which the frame is transferred from the customer terminal TM2a to the customer terminal TM1a contrary to the frame FL10 of FIG. 5. Moreover, in FIG. 6, the case in which the address table FDB maintains the correspondence relation between the customer address CMAC "CA1a" and the encapsulation address BMAC "BA1b" by the learning information control unit 22 of the switching device SWE2a is taken as an example unlike the case of FIG. 5. Hereinafter, detailed descriptions relating to the learning, retrieving and the like of the address table FDB will be omitted, and characteristic matters will be mainly described.

An unencapsulated frame (FL20, FL21) transmitted from the customer terminal TM2a is converted into an encapsulated frame in the switching device SWE2a. At this time, the switching device SWE2a determines "BA1b" as the destination encapsulation address BDA. The core switch SWC receives the encapsulated frame, and relays the encapsulated frame to either one of the LAG ports P1 and P2 based on a predetermined distribution rule. In FIG. 6, the frame relayed to the LAG port P1 is indicated by FL20, and the frame relayed to the LAG port P2 is indicated by FL21.

First, with respect to the frame FL20, the switching device SWE1a receives the frame (encapsulated frame) FL20 at the MCLAG port Pm3. Here, each of the switching devices SWE1a and SWE1b has a function of retrieving its own address table FDB by using the destination customer address CDA contained in the frame as a retrieval key when the destination encapsulation address BDA contained in the received encapsulated frame is the encapsulation address of the device itself or the encapsulation address of the peer device. In this case, since the destination encapsulation address BDA "BA1b" of the frame FL20 is the encapsulation address of the peer device, the switching device SWE1a (more specifically, relay processing unit 20) retrieves the address table FDB by using the destination customer address CDA "CA1a" as a retrieval key.

The switching device SWE1a is assumed to acquire an MCLAG identifier {MCLAG1a} serving as a destination port identifier as a result of the retrieval. Since the MCLAG port Pm1 of the switching device SWE1a serving as the member port of the MCLAG1a is controlled to the transmission/reception permitted state FW, the switching device SWE1a (more specifically, relay processing unit 20) determines the port identifier {Pm1} as the transmission port identifier. In other words, the switching device SWE1a determines its own MCLAG port Pm1 as the destination port. Since the destination port is a lower-link port, the switching device SWE1a converts the received frame (encapsulated frame) FL20 into an unencapsulated frame, and then relays the frame to the MCLAG port Pm1.

Next, with respect to the frame FL21, the switching device SWE1b receives the frame (encapsulated frame) FL21 at the MCLAG port Pm3. Then, since the destination encapsulation address BDA "BA1b" of the frame FL21 is an encapsulation address of the switching device SWE1b itself, the switching device SWE1b (more specifically, relay processing unit 20) retrieves the address table FDB by using the destination customer address CDA "CA1a" as a retrieval key.

The switching device SWE1b is assumed to acquire an MCLAG identifier {MCLAG1a} serving as a destination port identifier as a result of the retrieval. Since the MCLAG port Pm1 of the switching device SWE1b serving as the member port of the MCLAG1a is controlled to the transmission prohibited state TBK, the switching device SWE1b (more specifically, relay processing unit 20) determines the port identifier {Pb} as the transmission port identifier. In other words, the switching device SWE1b determines the bridge port Pb as the destination port.

Since the destination port is an upper-link port, the switching device SWE1b relays the received frame (encapsulated frame) FL21 directly to the bridge port Pb. At this time, the switching device SWE1b (more specifically, MCLAG identifier adding unit 23) adds an MCLAG identifier {MCLAG3a} corresponding to the reception port identifier SP to the frame FL21.

The switching device SWE1a receives the frame (encapsulated frame) FL21 to which the MCLAG identifier {MCLAG3a} is added at the bridge port Pb. Then, the switching device SWE1a (more specifically, relay processing unit 20) learns the source customer address CSA "CA2a" contained in the frame FL21 to the address table FDB in association with the source encapsulation address BSA "BA2a" and the MCLAG identifier {MCLAG3a} added to the frame FL21.

Furthermore, since the destination encapsulation address BDA "BA1b" of the frame FL21 is the encapsulation address of the peer device, the switching device SWE1a (more specifically, relay processing unit 20) retrieves the address table FDB by using the destination customer address CDA "CA1a" as a retrieval key. As a result, the switching device SWE1a acquires the MCLAG identifier {MCLAG1a} in the same manner as the case of the frame FL20, and then relays the frame (unencapsulated frame) FL21 to the MCLAG port Pm1 through the same process as the case of the frame FL20.

In this manner, in the case where the destination encapsulation address BDA is directed to the device itself or the peer device, each of the switching devices constituting the MCLAG switch retrieves its own address table FDB by using the destination customer address CDA as a retrieval key. Therefore, for example, even in the case where the encapsulation address BMAC in association with the same customer address CMAC "CA1a" is altered as shown in FIG. 20 and the encapsulation address BMAC is fixed as shown in FIG. 5, it is possible to carry out the frame relaying process without any problems.

As described above, by using the relay system and the switching device of the first embodiment, typically, it becomes possible to prevent the problem in which the leaning information of the address table is unnecessarily altered.

(Second Embodiment)

«Operation of Learning Information Control Unit (Application Example [1])»

Figures 7, 8:
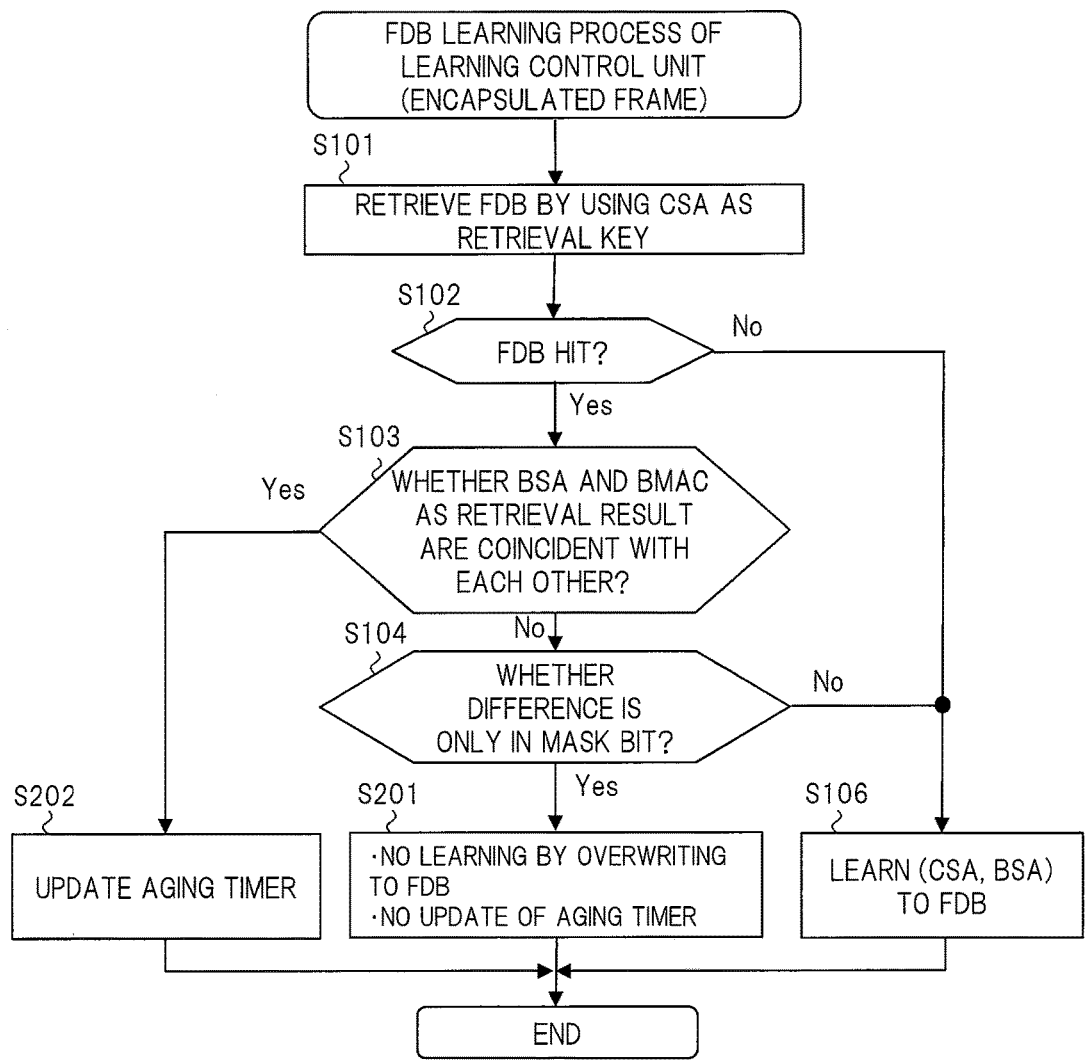
FIG. 7 is a flow diagram showing one example of the processing contents of the learning information control unit of FIG. 3 in a relay system according to the second embodiment of the present invention.
FIG. 8 is a supplementary view in which the main processing contents of FIG. 7 are summarized.

FIG. 7 is a flow diagram showing one example of processing contents of the learning information control unit of FIG. 3 in a relay system according to the second embodiment of the present invention. The processing flow shown in FIG. 7 differs from the processing flow shown in FIG. 4 in that the step S105 in FIG. 4 is changed to the step S201 and the step S202 is added. Since the other processing contents are the same as those shown in FIG. 4, detailed descriptions thereof will be omitted.

In the step S201, the learning information control unit 22 neither learns the correspondence relation between the source customer address CSA and the source encapsulation address BSA like the case of the step S105, nor updates an aging timer. Namely, in the case where the difference between the source encapsulation address BSA and the encapsulation address BMAC acquired from the address table FDB lies only in the mask bit 25 (step S104 (second case)) as described above, the learning information control unit 22 does not update the aging timer of the entry corresponding to the source customer address CSA, either.

Moreover, the step S202 is executed only when the source encapsulation address BSA and the encapsulation address BMAC acquired from the address table FDB are coincident with each other in the step S103. In this case, the learning information control unit 22 updates the aging timer of the entry corresponding to the source customer address CSA as shown in the step S202.

Note that, although the aging timer is omitted in the address table FDB shown in FIG. 3, each of the entries corresponding to the respective customer addresses CMAC includes an aging timer as shown in FIG. 17 to be described later. As is widely known, the aging timer is used for determining the remaining period of time until the corresponding entry is erased, and the remaining period of time is returned to the initial value when the aging timer is updated.

FIG. 8 is a supplementary view in which the main processing contents of FIG. 7 are summarized. FIG. 8 shows processing contents in the case where a predetermined encapsulation address BMAC has already been learned on the address table FDB and a source encapsulation address BSA that is the same as the encapsulation address BMAC or different only in the mask bit 25 is received. First, regardless of "0" or "1" of the mask bit 25 of the encapsulation address BMAC that has been leaned, learning on the address table FDB is not carried out when the source encapsulation address BSA which is the same or different only in the mask bit 25 is received.

On the other hand, in the case where the mask bit 25 of the encapsulation address BMAC that has been learned is "0", the aging timer is updated when a source encapsulation address BSA similarly having the mask bit 25="0" is received, and the aging timer is not updated when a source encapsulation address BSA having the mask bit 25="1" is received. Similarly, in the case where the mask bit 25 of the encapsulation address BMAC that has been learned is "1", the aging timer is updated when a source encapsulation address BSA similarly having the mask bit 25="1" is received, and the aging timer is not updated when a source encapsulation address BSA having the mask bit 25="0" is received.

«Operation of Main Part of Relay System (Comparative Example) and Problem thereof»

Figure 9:
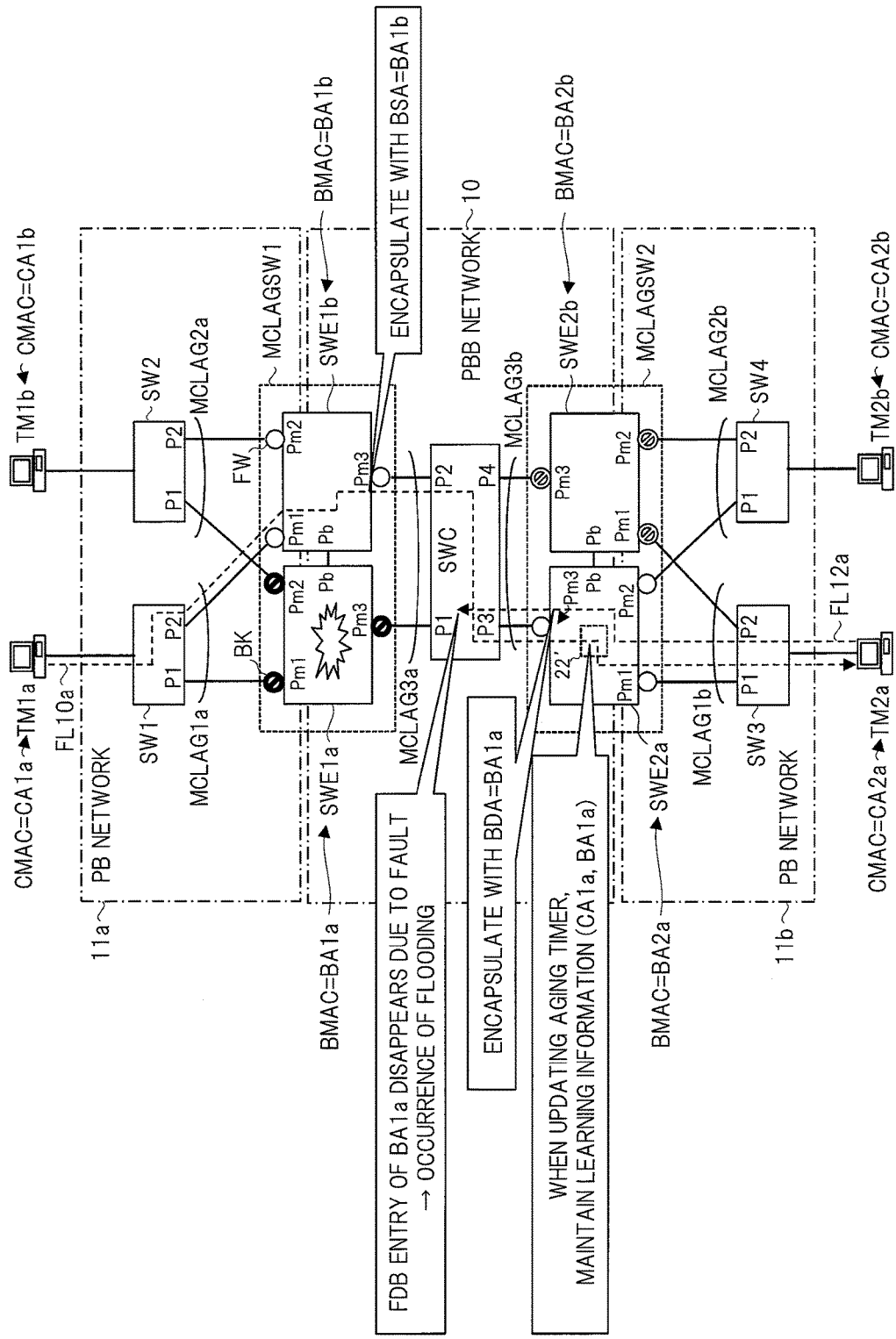
FIG. 9 is an explanatory view showing an operation example and a problem in the case where a learning information control unit always updates an aging timer in a relay system examined as a comparative example of the present invention.

FIG. 9 is an explanatory view showing an operation example and a problem in the case where a learning information control unit always updates an aging timer in a relay system examined as a comparative example of the present invention. Namely, if the aging timer is updated at the step S201 of FIG. 7 and the column of "UPDATE OF AGING TIMER" in FIG. 8 is all set to "◯", a problem shown in FIG. 9 may occur.

FIG. 9 shows an operation example in the case where a fault occurs in the switching device SWE1a in the state where the switching device SWE2a has learned the correspondence relation between the customer address CMAC "CA1a" and the encapsulation address BMAC "BA1a" as shown in FIG. 5. In this case, a switching operation in the occurrence of fault is carried out based on the MCLAG function. As a result, the MCLAG ports Pm1, Pm2 and Pm3 of the switching device SWE1a are controlled to, for example, the transmission/reception prohibited state BK in which the transmission and reception are both prohibited, and in place of this, the MCLAG ports Pm1, Pm2 and Pm3 of the switching device SWE1b are controlled to the transmission/reception permitted state FW.

The case in which a frame FL10a is transferred from the customer terminal TM1a to the customer terminal TM2a in this state is assumed. In this case, as a result of the detection of a fault in the switching device SWE1a by the switch SW1, the frame FL10a is received at the MCLAG port Pm1 of the switching device SWE1b unlike the frame FL10 of FIG. 5. Thus, the switching device SWE1b transmits the frame (encapsulated frame) FL10a containing the source encapsulation address BSA "BA1b" from the MCLAG port Pm3.

The switching device SWE2a receives the frame (encapsulated frame) FL10a. Here, since a learning information control unit (comparative example) 22' of the switching device SWE2a updates the aging timer also when the frame FL10a is received, the learning information control unit 22' continuously maintains the encapsulation address BSA "BA1*a*" that has been learned on the address table FDB. On the other hand, the core switch SWC stops receiving an encapsulated frame containing the source encapsulation address BSA "BA1*a*" due to the fault of the switching device SWE1*a*. For this reason, the entry of the encapsulation address BMAC "BA1*a*" disappears on the address table of the core switch SWC.

The case in which a frame FL12*a* is transferred from the customer terminal TM2*a* to the customer terminal TM1*a* in this state is assumed. The switching device SWE2*a* receives the frame (unencapsulated frame) FL12*a* and transmits the encapsulated frame containing the destination encapsulation address BDA "BA1*a*" from the MCLAG port Pm3 based on the result of retrieval of the address table FDB. The core switch SWC receives the frame (encapsulated frame) FL12*a*. However, since the core switch SWC does not retain the entry of the encapsulation address BMAC "BA1*a*" on the address table, the core switch SWC carries out flooding each time it receives the frame FL12*a*.

«Operation of Main Part of Relay System (Application Example [1])»

Figure 10:
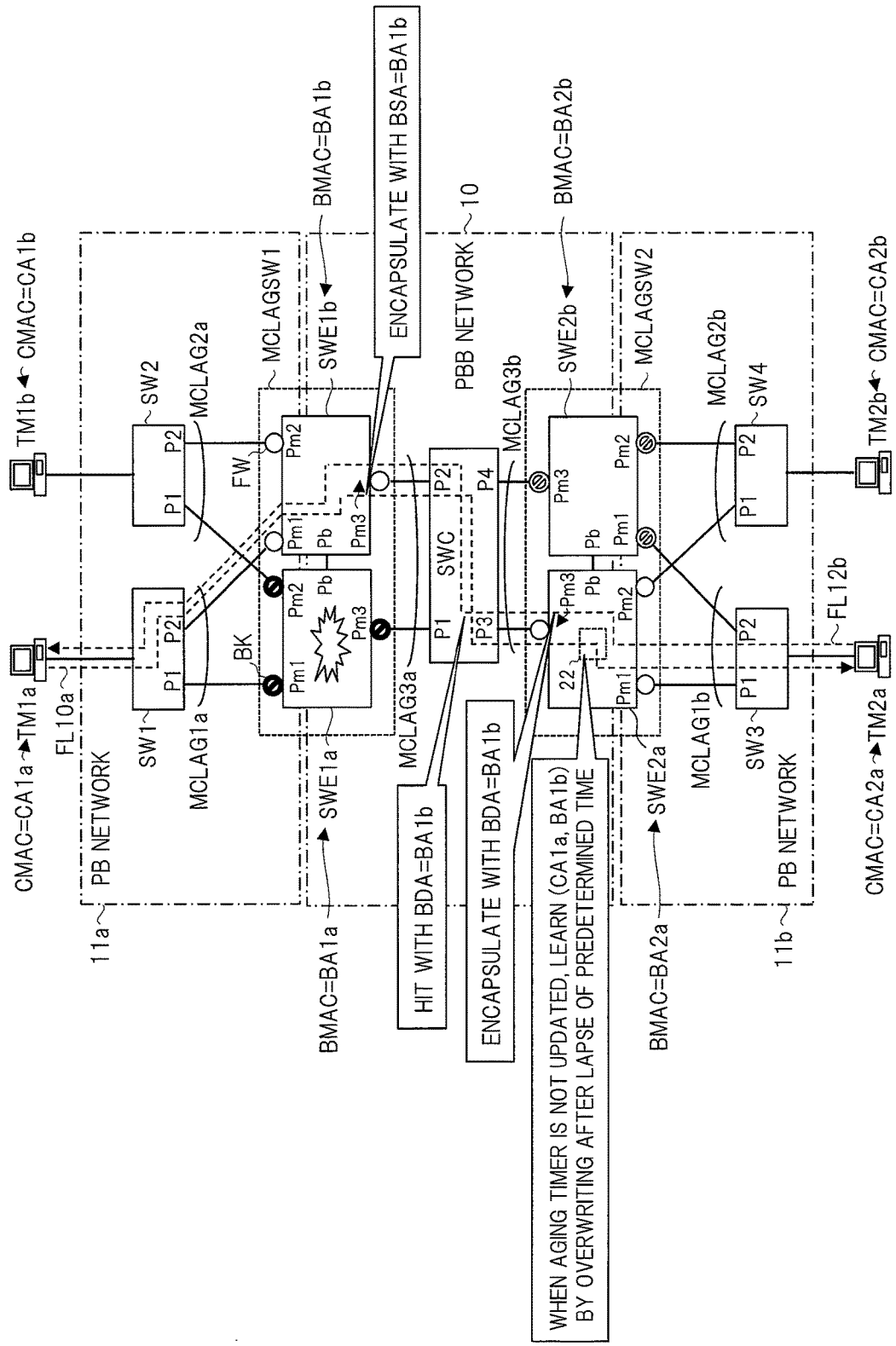
FIG. 10 is an explanatory view showing an operation example of a relay system provided with the learning information control unit of FIG. 7.

FIG. 10 is an explanatory view showing an operation example of a relay system provided with the learning information control unit of FIG. 7. In FIG. 10, the switching device SWE2*a* receives the frame (encapsulated frame) FL10*a* in a state where the encapsulation address BSA "BA1*a*" has been learned on the address table FDB like the case of FIG. 9. However, unlike the case of FIG. 9, the learning information control unit 22 of the switching device SWE2*a* does not update the aging timer when the frame FL10*a* is received.

For this reason, the entry of the encapsulation address BMAC "BA1*a*" disappears on the address table FDB of the switching device SWE2*a* after a lapse of a predetermined period. Then, the switching device SWE2*a* learns the correspondence relation between the customer address CMAC "CA1*a*" and the encapsulation address BMAC "BA1*b*" to the address table FDB based on the frame FL10*a* that is received thereafter.

As a result, unlike the case of FIG. 9, the switching device SWE2*a* transmits an encapsulated frame containing the destination encapsulation address BDA "BA1*b*" from the MCLAG port Pm3 when the frame (unencapsulated frame) FL12*a* is received. Since the core switch SWC retains the entry of the encapsulation address BMAC "BA1*b*" on the address table, it can relay the frame FL12*a* without causing the flooding.

As described above, by using the relay system and the switching device of the second embodiment, in addition to the various effects described in the first embodiment, the congestion of communication due to flooding can be reduced. In particular, since communications among a large number of customer networks are concentrated in the PBB network 10, it is desired to reduce the congestion of communication as much as possible. Therefore, the relay system and the switching device of the second embodiment can be effectively used.

(Third Embodiment)

«Operation of Learning Information Control Unit (Application Example [2])»

Figure 11:
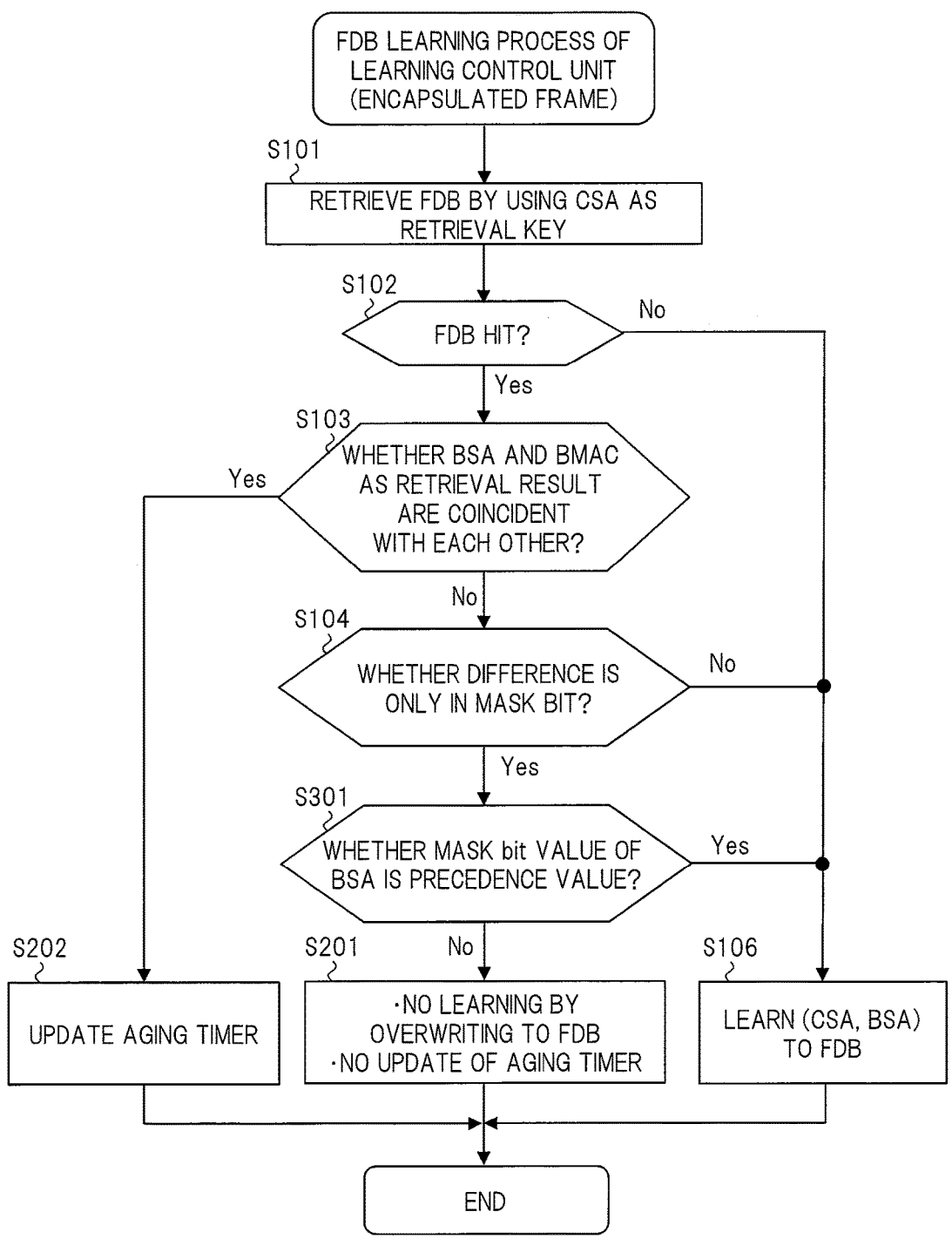
FIG. 11 is a flow diagram showing one example of the processing contents of the learning information control unit of FIG. 3 in a relay system according to the third embodiment of the present invention.

FIG. 11 is a flow diagram showing one example of processing contents of the learning information control unit of FIG. 3 in a relay system according to the third embodiment of the present invention. The processing flow shown in FIG. 11 differs from the processing flow shown in FIG. 7 in that the step S301 is added between the step S104 and the step S201 in FIG. 7. Since the other processing contents are the same as those shown in FIG. 7, detailed descriptions thereof will be omitted.

First, as the premise of the processing flow of FIG. 11, the learning information control unit 22 of FIG. 3 has a precedence value preliminarily set with respect to the value of the mask bit 25. Under the premise, the learning information control unit 22 executes the process of the step S106 in the case where the difference in the encapsulation addresses lies only in the mask bit 25 as described earlier (step S104 (second case)) and the mask bit 25 contained in the source encapsulation address BSA is the precedence value (step S301 (third case)). Namely, the learning information control unit 22 learns the correspondence relation between the source customer address CSA and the source encapsulation address BSA to the address table FDB (step S106).

On the other hand, in the second case mentioned above, the learning information control unit 22 executes the process of the step S201 when the mask bit 25 contained in the source encapsulation address BSA is not the precedence value (step S301 (fourth case)). Namely, the learning information control unit 22 neither learns the correspondence relation between the source customer address CSA and the source encapsulation address BSA to the address table FDB, nor updates the aging timer (step S201).

FIG. 12 is a supplementary view in which the main processing contents of FIG. 11 are summarized. In FIG. 12, in the example in which the precedence value of the mask bit 25 is "1", the presence or absence of the learning of the address table FDB and the presence or absence of the update of the aging timer are indicated in the same manner as the case of FIG. 8. First, the presence or absence of the update of the aging timer is the same as that of FIG. 8. Meanwhile, with respect to the learning of the address table FDB, unlike the case of FIG. 8, the learning of the address table FDB is carried out when the mask bit 25 of the encapsulation address BMAC that has been learned is "0" and a source encapsulation address BSA having the mask bit 25="1" (that is, precedence value) is received.

«Operation of Main Part of Relay System (Application Example [2-1])»

Figure 13:
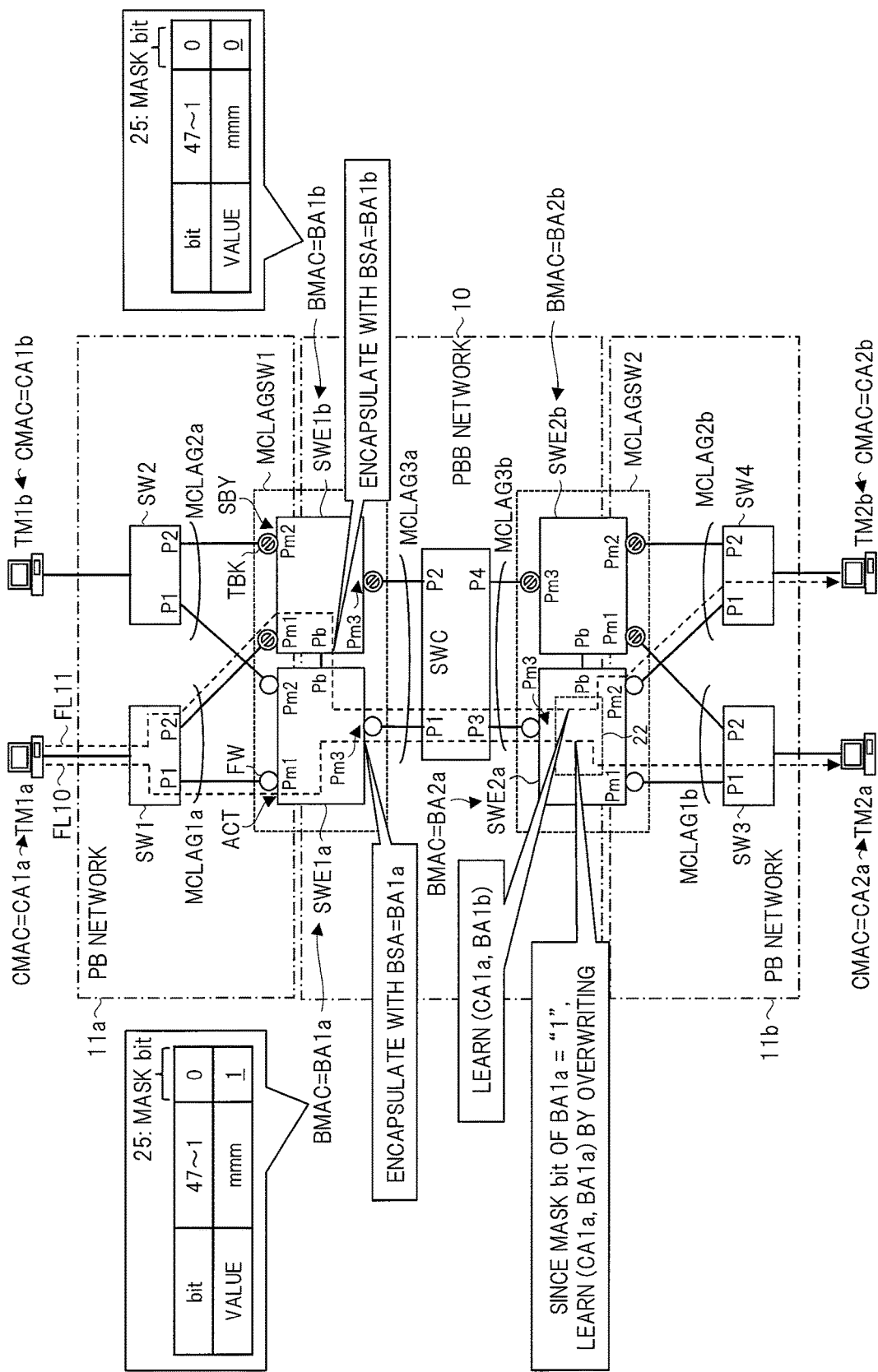
FIG. 13 is an explanatory view showing an operation example of a relay system provided with the learning information control unit of FIG. 11.

FIG. 13 is an explanatory view showing an operation example of a relay system provided with the learning information control unit of FIG. 11. The relay system shown in FIG. 13 has the same configuration as that of the relay system shown in FIG. 3, FIG. 5 or the like. The case in which the frame FL11 is transferred from the customer terminal TM1*a* to the customer terminal TM2*b* and then the frame FL10 is transferred from the customer terminal TM1*a* to the customer terminal TM2*a* in this relay system contrary to the case of FIG. 5 is assumed.

The frame FL11 is transferred to the switching device SWE2*a* in the same manner as the case of FIG. 5. The switching device SWE2*a* receives the frame (encapsulated frame) FL11, and learns the source customer address CSA "CA1*a*" thereof to the address table FDB in association with the source encapsulation address BSA "BA1*b*".

Thereafter, the frame FL10 is also transferred to the switching device SWE2*a* in the same manner as the case of FIG. 5. The switching device SWE2*a* receives the frame (encapsulated frame) FL10. Here, the value of the mask bit 25 contained in the source encapsulation address BSA "BA1*a*" of the frame FL10 is the precedence value "1". Therefore, the learning information control unit 22 of the switching device SWE2*a* learns the source customer address CSA "CA1a" by overwriting to the address table FDB in association with the source encapsulation address BSA "BA1a".

Thereafter, the switching device SWE2a maintains the correspondence relation between the customer address CMAC "CA1a" and the encapsulation address BMAC "BA1a" on the address table FDB even when either the frame FL10 or the frame FL11 is received. By setting the precedence value in this manner, it is possible to select which encapsulation address BMAC of the switching device SWE1a or the switching device SWE1b is maintained on the address table FDB. Thus, for example, the effects as described below can be obtained.

140 Operation of Main Part of Relay System (Comparative Example) and Problem Thereof«

Figure 14:
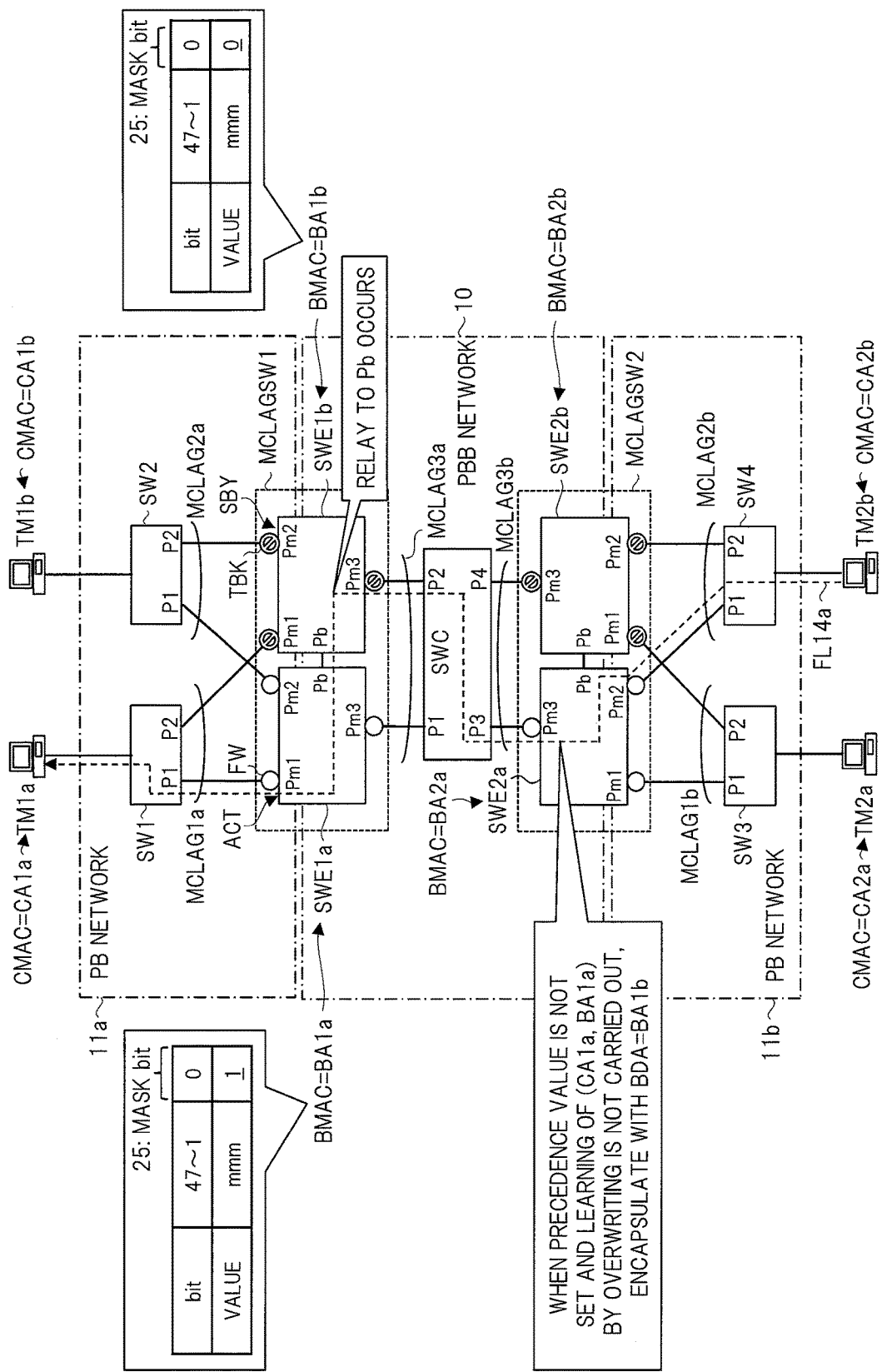
FIG. 14 is an explanatory view showing an operation example and an example of a problem of a relay system examined as a comparative example of FIG. 13.

FIG. 14 is an explanatory view showing an operation example and an example of a problem of a relay system examined as a comparative example of FIG. 13. In the example of FIG. 14, it is assumed as a premise that the precedence value is not determined unlike the method of the first embodiment or the second embodiment and consequently the learning information control unit 22 of the switching device SWE2a does not carry out the learning of the address table FDB in response to the reception of the frame FL10 of FIG. 13. Namely, the learning information control unit 22 maintains the correspondence relation between the customer address CMAC "CA1a" and the encapsulation address BMAC "BA1b" on the address table FDB. Then, the case in which a frame FL14a is transferred from the customer terminal TM2b to the customer terminal TM1a in this state as shown in FIG. 14 is assumed.

The switching device SWE2a converts the frame (unencapsulated frame) FL14a received at the MCLAG port Pm2 into an encapsulated frame containing the destination encapsulation address BDA "BA1b", and then relays the frame to the MCLAG port Pm3. The core switch SWC relays the frame FL14a to either one of the LAG ports P1 and P2 based on a predetermined distribution rule. In this case, the frame FL14a is assumed to be relayed to the LAG port P2.

The switching device SWE1b receives the frame (encapsulated frame) FL14a at the MCLAG port Pm3, and retrieves the address table FDB by using the destination customer address CDA "CA1a" of the frame as a retrieval key. As a result, the switching device SWE1b acquires an MCLAG identifier {MCLAG1a} serving as a destination port identifier. Since the MCLAG port Pm1 of the switching device SWE1b corresponding to the MCLAG identifier {MCLAG1a} is set to the transmission prohibited state TBK, the switching device SWE1b determines the port identifier {Pb} as the transmission port identifier.

In this manner, in the case where no precedence value is determined, the number of frames to be transmitted from the bridge port Pb may increase. The bridge port Pb transmits or receives an MCLAG control frame for realizing a predetermined MCLAG operation system in addition to the normal user frame. Therefore, in order to reduce the congestion of the communication between the bridge ports Pb, it is sometimes desired to reduce the number of user frames to be transmitted from the bridge port Pb.

«Operation of Main Part of Relay System (Application Example [2-2])»

Figure 15:
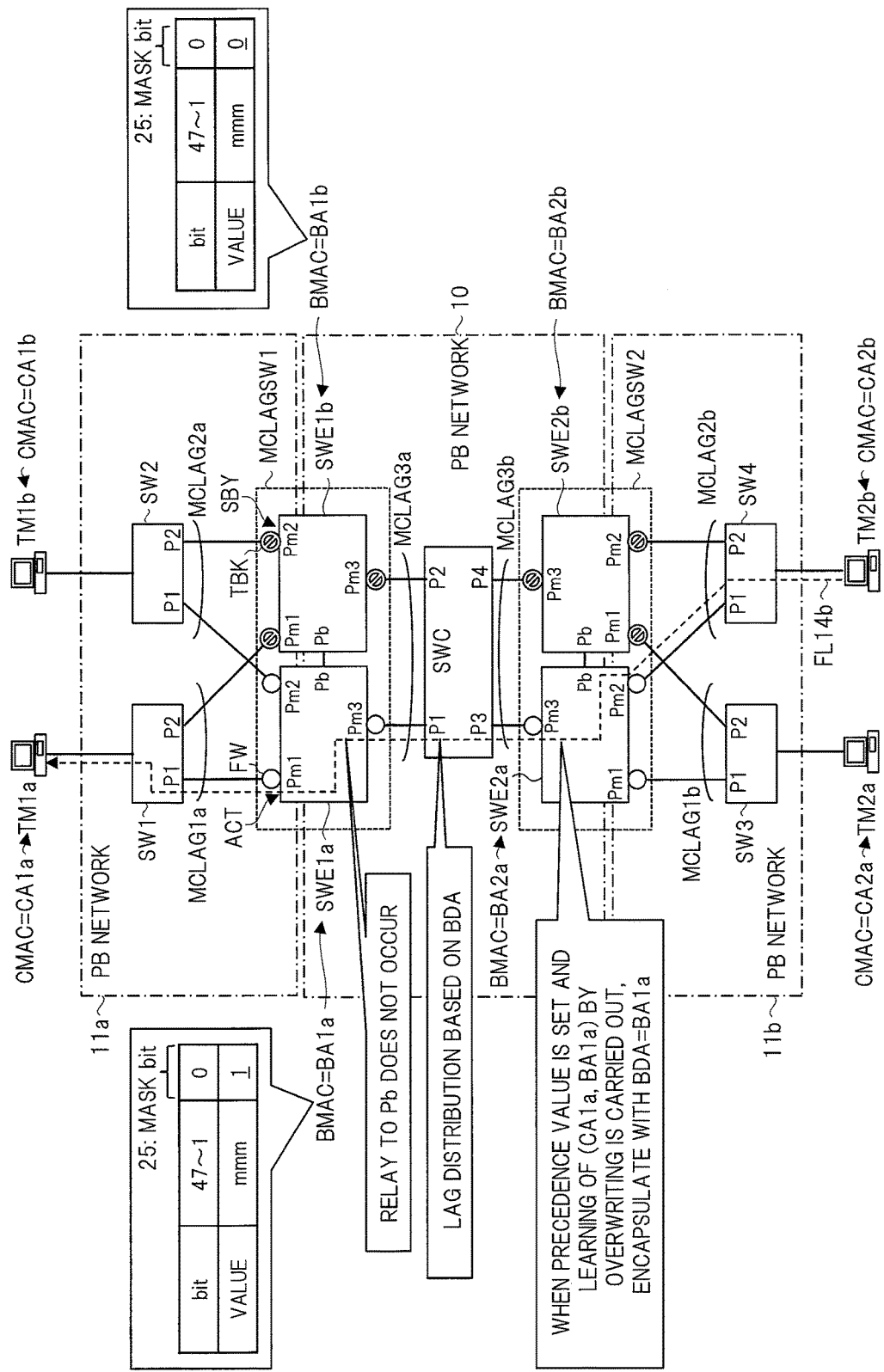
FIG. 15 is an explanatory view showing an operation example continued from FIG. 13.

FIG. 15 is an explanatory view showing an operation example continued from FIG. 13. In the example of FIG. 15, it is assumed as a premise that a precedence value in the learning information control unit 22 is determined so that the switching device (in this case, SWE1a) on the side to be set to the active ACT in the MCLAG switch MCLAGSW1 is given priority as shown in FIG. 13. Thus, the learning information control unit 22 of the switching device SWE2a maintains the correspondence relation between the customer address CMAC "CA1a" and the encapsulation address BMAC "BA1a" in the address table FDB. The case in which a frame FL14b is transferred from the customer terminal TM2b to the customer terminal TM1a in this state in the same manner as the case of FIG. 14 is assumed.

The switching device SWE2a converts the frame (unencapsulated frame) FL14b received at the MCLAG port Pm2 into an encapsulated frame containing the destination encapsulation address BDA "BA1a", and then relays the frame to the MCLAG port Pm3. The core switch SWC relays the frame FL14b to either one of the LAG ports P1 and P2 based on a predetermined distribution rule.

Here, it is assumed that hash operations based on the destination encapsulation address BDA are used for the predetermined distribution rule, and the LAG port P1 is selected when the $0^{th}$ bit of the destination encapsulation address BDA is an odd number based on the hash operations and the LAG port P2 is selected when it is an even number. In this case, unlike the case of FIG. 14, the $0^{th}$ bit of the destination encapsulation address BDA "BA1a" is an odd number '1', and thus the core switch SWC relays the received frame (encapsulated frame) FL14b to the LAG port P1.

The switching device SWE1a receives the frame (encapsulated frame) FL14b at the MCLAG port Pm3, and retrieves the address table FDB by using the destination customer address CDA "CA1a" of the frame as a retrieval key. As a result, the switching device SWE1a acquires an MCLAG identifier {MCLAG1a} serving as a destination port identifier. Since the MCLAG port Pm1 of the switching device SWE1a corresponding to the MCLAG identifier {MCLAG1a} is set to the transmission/reception permitted state FW, the switching device SWE1a determines the port identifier {Pm1} as the transmission port identifier. Thus, it becomes possible to solve the problem described in FIG. 14.

As described above, by using the relay system and the switching device of the third embodiment, in addition to the various effects described in the first and second embodiments, it becomes possible to reduce the congestion of communication between the bridge ports Pb.

(Fourth Embodiment)

«Detailed Description of Switching Device»

Figure 16:
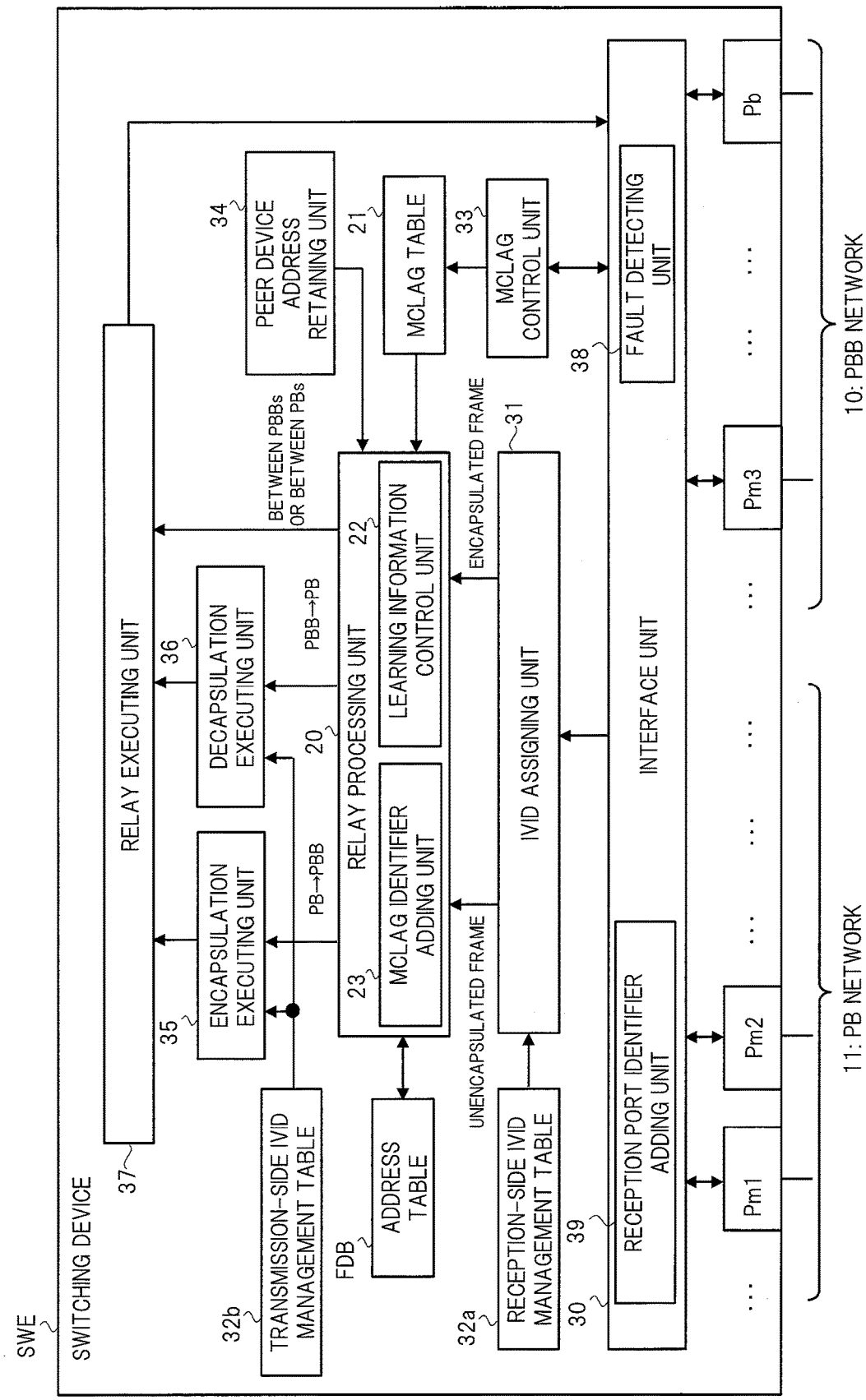
FIG. 16 is a block diagram showing a configuration example of a main part in a switching device according to the fourth embodiment of the present invention.

FIG. 16 is a block diagram showing a configuration example of a main part in a switching device according to the fourth embodiment of the present invention. FIG. 17 is a schematic view showing a configuration example of an address table shown in FIG. 16. FIG. 18 is a schematic view showing a configuration example of an MCLAG table in FIG. 16. FIG. 19A is a schematic view showing a configuration example of a reception-side IVID management table in FIG. 16, and FIG. 19B is a schematic view showing a configuration example of a transmission-side IVID management table in FIG. 16.

The switching device SWE shown in FIG. 16 corresponds to, for example, each of the switching devices SWE1a, SWE1b, SWE2a and SWE2b of FIG. 3. The switching device SWE is provided with a lower-link port connected to the outside of the PBB network 10 (for example, PB network 11), an upper-link port connected to the PBB network 10, various processing units and various tables. The lower-link port includes at least one or more MCLAG ports, and two MCLAG ports Pm1 and Pm2 are included therein in the example of FIG. 16. The upper-link port includes, for example, a bridge port Pb and an MCLAG port Pm3. Hereinafter, the various processing units and various tables will be described.

An interface unit 30 includes a reception buffer and a transmission buffer, transmits or receives an unencapsulated frame to or from the lower-link ports (Pm1, Pm2), and transmits or receives an encapsulated frame to or from the upper-link ports (Pm3, Pb). Further, the interface unit 30 includes a fault detecting unit 38 and a reception port identifier adding unit 39. When a frame is received at any of the plurality of ports, the reception port identifier adding unit 39 adds a reception port identifier to the frame.

The fault detecting unit 38 detects presence or absence of fault (presence or absence of link down) for each of the plurality of ports by hardware. For example, the fault detecting unit 38 monitors a received optical signal level and detects the presence of link down when an abnormal state such as the insufficiency of the optical signal level continues for a predetermined period. Alternatively, the fault detecting unit 38 monitors the presence or absence of link pulse signal generated in an idle state and the presence or absence of data signal in a non-idle state based on received signals, and detects the presence of link down when an abnormal state such as the absence of both of link pulse signal and data signal continues for a predetermined period.

An IVID assigning unit 31 assigns an internal VLAN identifier IVID to an unencapsulated frame received at the lower-link port or an encapsulated frame received at the upper-link port based on a reception-side IVID management table 32a determined in advance by a service provider or the like. As shown in FIG. 19A, the reception-side IVID management table 32a retains the combination of the service VLAN identifier SVID and the reception port identifier in association with the internal VLAN identifier IVID.

The service VLAN identifier SVID is contained in an unencapsulated frame, and the reception port identifier is added to the unencapsulated frame by the reception port identifier adding unit 39. The IVID assigning unit 31 acquires the internal VLAN identifier IVID corresponding to the service VLAN identifier SVID and the reception port identifier from the reception-side IVID management table 32a, and adds the internal VLAN identifier IVID to an unencapsulated frame to transmit it to the relay processing unit 20.

Also, as shown in FIG. 19A, the reception-side IVID management table 32a retains the combination of the backbone VLAN identifier BVID and the reception port identifier in association with the internal VLAN identifier IVID. The backbone VLAN identifier BVID is contained in an encapsulated frame, and the reception port identifier is added to the encapsulated frame by the reception port identifier adding unit 39. The IVID assigning unit 31 acquires the internal VLAN identifier IVID corresponding to the backbone VLAN identifier BVID and the reception port identifier from the reception-side IVID management table 32a, and adds the internal VLAN identifier IVID to an encapsulated frame to transmit it to the relay processing unit 20.

As shown in FIG. 18, the MCLAG table 21 retains one or a plurality of MCLAG ports in association with one or a plurality of MCLAG identifiers, respectively. Further, in this example, the MCLAG table 21 retains also a control state of each MCLAG port. In the example of FIG. 18, the port identifier {Pm1} representing the MCLAG port Pm1 is associated with the MCLAG identifier {MCLAG1a} and is controlled to the transmission/reception permitted state FW. Also, the port identifiers {Pm2} and {Pm3} representing the MCLAG ports Pm2 and Pm3 are associated with the MCLAG identifiers {MCLAG2a} and {MCLAG3a}, respectively, and are controlled to the transmission/reception permitted state FW.

As shown in FIG. 17, the address table FDB retains the customer address present ahead of a lower-link port in association with the port identifier representing the lower-link port or the MCLAG identifier corresponding to the lower-link port, the internal VLAN identifier IVID and an aging timer value. Also, the address table FDB retains the customer address present ahead of an upper-link port in association with the encapsulation address, the port identifier representing the upper-link port or the MCLAG identifier corresponding to the upper-link port, the internal VLAN identifier IVID and an aging timer value.

In FIG. 17, as one example, the address table FDB of the switching device SWE1a of FIG. 3 is shown. For example, a customer address CA1b present ahead of the MCLAG port (lower-link port) Pm2 is retained in association with an MCLAG identifier {MCLAG2a}, an internal VLAN identifier IVID "xxx" and an aging timer value t1b. Moreover, a customer address CA2a present ahead of the MCLAG port (upper-link port) Pm3 is retained in association with an encapsulation address BMAC "BA2a", an MCLAG identifier {MCLAG3a}, an internal VLAN identifier IVID "xxx" and an aging timer value t2a.

For example, the MCLAG control unit 33 controls the operation of the MCLAG switch MCLAGSW by transmitting and receiving various control frames. One example of the control frames is an MCLAG control frame for performing the transmission and reception to and from a peer device at regular intervals via bridge ports Pb. By the transmission and the reception of the MCLAG control frame, the fault information can be shared between the respective switching devices and the living of the respective switching devices can be confirmed.

Also, as another example, the control frames may include a control frame such as Ethernet OAM (Operations, Administration, and Maintenance). In the Ethernet OAM, for example, the continuity with an outside of the device can be monitored by transmitting and receiving a control frame (test frame) referred to as CCM (Continuity Check Message) or the like at regular intervals. In this manner, for example, the presence or absence of fault at the MCLAG ports Pm1, Pm2 and Pm3 can be detected.

The MCLAG control unit 33 determines the control state of each MCLAG port in the MCLAG table 21 based on the fault information from the fault detecting unit 38, the fault information acquired from a MCLAG control frame or CCM, and setting information of active ACT and standby SBY determined in advance. Specifically, when the MCLAG port of its own device has a fault, the MCLAG control unit 33 controls the MCLAG port to the transmission/reception prohibited state or the like.

Also, when the MCLAG port of its own device has no fault and is set to the active ACT, the MCLAG control unit 33 controls the MCLAG port to the transmission/reception permitted state FW. Further, when the MCLAG port of its own device has no fault and is set to the standby SBY, the MCLAG control unit 33 controls the MCLAG port of its own device in accordance with the presence or absence of fault at the MCLAG port on an active ACT side.

Specifically, when the MCLAG port on the active ACT side has no fault, the MCLAG control unit 33 controls the MCLAG port of its own device to the transmission prohibited state TBK, and when the MCLAG port on the active ACT side has a fault, the MCLAG control unit 33 controls the MCLAG port of its own device to the transmission/ reception permitted state FW. The information of the presence or absence of fault at the MCLAG port on the active ACT side can be acquired by the MCLAG control frame described above.

The relay processing unit 20 includes the learning information control unit 22 and the MCLAG identifier adding unit 23, and performs the learning and retrieval of the address table FDB when receiving a frame at a port. Specifically, when receiving a frame at a port, the relay processing unit 20 learns various kinds of information shown in FIG. 17 to the address table FDB in accordance with whether the frame is an unencapsulated frame or an encapsulated frame. Moreover, when the frame is an encapsulated frame, operations by the learning information control unit 22 are also carried out as described in FIG. 4, FIG. 7 or FIG. 11.

In the address table FDB of FIG. 17, the internal VLAN identifier IVID is determined by the IVID assigning unit 31. The port identifier in the port ID/MCLAG ID is determined by the reception port identifier adding unit 39. The MCLAG identifier in the port ID/MCLAG ID is determined with reference to the MCLAG table 21 based on the reception port identifier added by the reception port identifier adding unit 39. Also, when receiving a frame to which an MCLAG identifier is added from the peer device, the MCLAG identifier in the port ID/MCLAG ID is determined to be the MCLAG identifier.

Also, when receiving an unencapsulated frame, the relay processing unit 20 retrieves the address table FDB by using the destination customer address CDA contained in the frame and the internal VLAN identifier IVID added to the frame as retrieval keys, thereby acquiring the destination port identifier and the destination encapsulation address BDA. On the other hand, when receiving an encapsulated frame, the relay processing unit 20 carries out the following processes in accordance with the destination encapsulation address BDA contained in the frame.

First, when the destination encapsulation address BDA is the encapsulation address of its own device or the peer device, the relay processing unit 20 retrieves the address table FDB by using the destination customer address CDA contained in the frame and the internal VLAN identifier IVID added to the frame as retrieval keys, thereby acquiring the destination port identifier. The encapsulation address of the peer device is retained in a peer device address retaining unit 34 in advance. On the other hand, when the destination encapsulation address BDA is not the encapsulation address of its own device or the peer device, the relay processing unit 20 retrieves the address table FDB by using the destination encapsulation address BDA contained in the frame and the internal VLAN identifier IVID added to the frame as retrieval keys, thereby acquiring the destination port identifier.

Then, when the destination port identifier acquired in the above-described manner is not the MCLAG identifier but the normal port identifier, the relay processing unit 20 determines the destination port identifier as the transmission port identifier. On the other hand, when the destination port identifier is the MCLAG identifier, the relay processing unit 20 determines the control state of the MCLAG port of its own device serving as a member port of the MCLAG identifier based on the MCLAG table 21. When the control state of the MCLAG port of its own device is the transmission/reception permitted state FW, the relay processing unit 20 determines the port identifier of the MCLAG port as the transmission port identifier, and when the control state is the transmission prohibited state TBK, the relay processing unit 20 determines the port identifier {Pb} of the bridge port Pb as the transmission port identifier.

The relay processing unit 20 adds the transmission port identifier determined in the above-described manner to the frame. At this time, when the reception port identifier is an MCLAG identifier, the MCLAG identifier adding unit 23 further adds the MCLAG identifier to the frame. Then, the relay processing unit 20 transmits the frame to a different processing unit in accordance with the correspondence relation between the reception port identifier and the transmission port identifier.

Specifically, when the reception port identifier is the lower-link port and the transmission port identifier is the upper-link port, the relay processing unit 20 transmits an unencapsulated frame to an encapsulation executing unit 35. Also, when the reception port identifier is the upper-link port and the transmission port identifier is the lower-link port, the relay processing unit 20 transmits an encapsulated frame to a decapsulation executing unit 36. Further, when both of the reception port identifier and the transmission port identifier are the lower-link ports or the upper-link ports, the relay processing unit 20 transmits a frame to a relay executing unit 37.

The encapsulation executing unit 35 converts the received unencapsulated frame into an encapsulated frame. At this time, the encapsulation executing unit 35 determines an encapsulation address of its own device as the source encapsulation address BSA, and determines the destination encapsulation address BDA acquired by the relay processing unit 20 as a destination encapsulation address BDA. Moreover, the encapsulation executing unit 35 determines the service instance identifier ISID and the backbone VLAN identifier BVID based on the transmission-side IVID management table 32b determined in advance by the service provider or the like.

As shown in FIG. 19B, the transmission-side IVID management table 32b retains the combination of the internal VLAN identifier IVID and the transmission port identifier in association with the service instance identifier ISID and the backbone VLAN identifier BVID. The internal VLAN identifier IVID is added to the unencapsulated frame by the IVID assigning unit 31, and the transmission port identifier is added to the frame by the relay processing unit 20. Based on this, the encapsulation executing unit 35 generates an encapsulated frame containing the service instance identifier ISID and the backbone VLAN identifier BVID, and transmits it to the relay executing unit 37.

The decapsulation executing unit 36 converts the received encapsulated frame into an unencapsulated frame. At this time, the decapsulation executing unit 36 determines the service VLAN identifier SVID based on the transmission-side IVID management table 32b. As shown in FIG. 19B, the transmission-side IVID management table 32b retains the combination of the internal VLAN identifier IVID and the transmission port identifier in association with the service VLAN identifier SVID other than the information described above. Based on this, the decapsulation executing unit 36 generates an unencapsulated frame containing the service VLAN identifier SVID, and transmits it to the relay executing unit 37.

The relay executing unit 37 transmits the above-described frames from each of the processing units (unencapsulated frame or encapsulated frame) to a predetermined transmission buffer in the interface unit 30. The predetermined transmission buffer corresponds to the transmission port identifier added to the frame. At this time, the relay executing unit 37 deletes the unnecessary information added to the frame (for example, internal VLAN identifier IVID and transmission port identifier). The transmission buffer in the interface unit 30 receives the frame from the relay executing unit 37, and transmits the frame to a corresponding port (that is, lower-link port or upper-link port corresponding to transmission port identifier).

Note that the configuration example in which the conversion between the service VLAN identifier SVID and the service instance identifier ISID and backbone VLAN identifier BVID is performed via the internal VLAN identifier IVID has been described here, but the configuration in which the conversion therebetween is performed without the internal VLAN identifier IVID can also be used. For example, it is also possible to determine the correspondence relation between the service VLAN identifier SVID and the service instance identifier ISID and backbone VLAN identifier BVID in a table and perform the conversion by using the table. In this case, the backbone VLAN identifier BVID needs to be learned to the address table FDB instead of the internal VLAN identifier IVID.

In addition, the configuration example of a switching device which constitutes an MCLAG switch has been shown here, but a switching device which does not constitute an MCLAG switch such as the switching devices SWE3 and SWE4 of FIG. 1 is also configured in approximately the same manner as FIG. 16. The switching device which does not constitute an MCLAG switch has a configuration of FIG. 16 from which the peer device address retaining unit 34, the MCLAG table 21, the MCLAG control unit 33, the MCLAG identifier adding unit 23 and the like are eliminated.

In the foregoing, the invention made by the inventor of the present invention has been concretely described based on the embodiments. However, it is needless to say that the present invention is not limited to the foregoing embodiments and various modifications and alterations can be made within the scope of the present invention. For example, the embodiments above have been described in detail so as to make the present invention easily understood, and the present invention is not limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

What is claimed is:

1. A relay system comprising:
a first switching device, a second switching device and a third switching device which are disposed at an entrance or an exit of a PBB network in which a relay based on a PBB standard is carried out, convert an unencapsulated frame received from outside of the PBB network into an encapsulated frame to relay the frame to the PBB network, and convert the encapsulated frame received from the PBB network into the unencapsulated frame to relay the frame to the outside of the PBB network,
wherein the unencapsulated frame contains a customer address, the encapsulated frame has a configuration in which an encapsulation address including a plurality of bits is added to the unencapsulated frame based on the PBB standard, each of the first switching device and the second switching device includes: a lower-link port which transmits or receives the unencapsulated frame;
an upper-link port which transmits or receives the encapsulated frame;
one or a plurality of MCLAG ports including a first MCLAG port serving as the lower-link port on which an inter-device LAG is set; and
a bridge port serving as the upper-link port, which connects the first switching device and the second switching device with each other,
the encapsulation address of the first switching device is set so as to be different only in a part of the plurality of bits in comparison with the encapsulation address of the second switching device,
the third switching device includes:
a lower-link port for transmitting or receiving the unencapsulated frame;
an upper-link port for transmitting or receiving the encapsulated frame;
an address table which retains the customer address present ahead of the lower-link port in association with a port identifier representing the lower-link port and retains the customer address present ahead of the upper-link port in association with the encapsulation address and a port identifier representing the upper-link port; and
a learning information control unit which, in a first case in which the encapsulated frame is received at the upper-link port and the encapsulation address corresponding to the source customer address of the encapsulated frame is acquired from the address table
wherein the learning information control unit of the third switching device in a second case determines whether the difference between the source encapsulation address of the encapsulated frame and the encapsulation address acquired from the address table lies only in the part of the plurality of bits;
wherein, when the difference lies only in the part of the plurality of bits, the third switching device does not learn the correspondence relation between the source customer address and the source encapsulation address to the address table; and
wherein, when the difference lies not only in the part of the plurality of bits, the third switching device learns the correspondence relation between the source customer address and the source encapsulation address to the address table.

2. The relay system according to claim 1,
wherein, in the second case, the learning information control unit does not update an aging timer of an entry corresponding to the customer address on the address table.

3. The relay system according to claim 1,
wherein, in a case where a precedence value is determined and in the second case, the learning information control unit learns the correspondence relation to the address table in a third case in which the part of the plurality of bits contained in the source encapsulation address of the encapsulated frame is the precedence value, and the learning information control unit does not learn the correspondence relation to the address table in a fourth case in which the part of the plurality of bits is not the precedence value.

4. The relay system according to claim 1,
wherein, when relaying the unencapsulated frame received at its own first MCLAG port to the upper-link port, each of the first switching device and the second switching device generates the encapsulated frame by using the encapsulation address of the device itself.

5. The relay system according to claim 4,
wherein each of the first switching device and the second switching device further include:
an address table which retains the customer address present ahead of the lower-link port in association with a port identifier representing the lower-link port or an MCLAG identifier corresponding to the lower-link port, and retains the customer address present ahead of the upper-link port in association with the encapsulation address and a port identifier representing the upper-link port or an MCLAG identifier corresponding to the upper-link port;
a relay processing unit which carries out learning and retrieval of the address table; and
an MCLAG identifier adding unit which adds an MCLAG identifier corresponding to the MCLAG port to the frame when relaying the frame received at the MCLAG port to the bridge port.

6. The relay system according to claim 5,
wherein, in the case where the destination encapsulation address contained in the received encapsulated frame is the encapsulation address of the first switching device or the second switching device, the relay processing unit retrieves the address table of the first switching device by using the destination customer address contained in the encapsulated frame as a retrieval key.

7. A switching device comprising:
a lower-link port which is disposed at an entrance or an exit of a PBB network in which a relay based on a PBB standard is carried out, converts an unencapsulated frame received from outside of the PBB network into an encapsulated frame to relay the frame to the PBB network, and converts the encapsulated frame received from the PBB network into the unencapsulated frame to relay the frame to the outside of the PBB network, and thus transmits or receives the unencapsulated frame; and
an upper-link port which transmits or receives the encapsulated frame,
wherein the unencapsulated frame contains a customer address,
the encapsulated frame has a configuration in which an encapsulation address including a plurality of bits is added to the unencapsulated frame based on the PBB standard,
the switching device is connected to two different switching devices disposed at an entrance or an exit of the PBB network through the PBB network,
the two different switching devices have the lower-link ports on which an inter-device LAG is set, and
the encapsulation address of one of the two different switching devices is set so as to be different only in a part of the plurality of bits in comparison with the encapsulation address of the other switching device,
the switching device further comprising:
an address table which retains the customer address present ahead of the lower-link port in association with a port identifier representing the lower-link port and retains the customer address present ahead of the upper-link port in association with the encapsulation address and a port identifier representing the upper-link port; and
a learning information control unit which, in a first case in which the encapsulated frame is received at the upper-link port and the encapsulation address corresponding to the source customer address of the encapsulated frame is acquired from the address table
wherein the learning information control unit of the switching device in a second case determines whether the difference between the source encapsulation address of the encapsulated frame and the encapsulation address acquired from the address table lies only in the part of the plurality of bits;
wherein, when the difference lies only in the part of the plurality of bits, the switching device does not learn the correspondence relation between the source customer address and the source encapsulation address to the address table; and
wherein, when the difference lies not only in the part of the plurality of bits, the switching device learns the correspondence relation between the source customer address and the source encapsulation address to the address table.

8. The switching device according to claim 7,
wherein, in the second case, the learning information control unit does not update an aging timer of an entry corresponding to the customer address on the address table.

9. The switching device according to claim 7,
wherein, in a case where a precedence value is determined and in the second case, the learning information control unit learns the correspondence relation to the address table in a third case in which the part of the plurality of bits contained in the source encapsulation address of the encapsulated frame is the precedence value, and the learning information control unit does not learn the correspondence relation to the address table in a fourth case in which the part of the plurality of bits is not the precedence value.

10. The switching device according to claim 7, further comprising:
one or a plurality of MCLAG ports including a first MCLAG port serving as the lower-link port on which an inter-device LAG is set;
a bridge port serving as the upper-link port, which connects the switching device and a peer switching device with each other;
a relay processing unit which carries out learning and retrieval of the address table; and
an MCLAG identifier adding unit which adds an MCLAG identifier corresponding to the MCLAG port to the frame when relaying the frame received at the MCLAG port to the bridge port,
wherein the address table retains the customer address present ahead of the lower-link port in association with a port identifier representing the lower-link port or an MCLAG identifier corresponding to the lower-link port, and retains the customer address present ahead of the upper-link port in association with the encapsulation address and a port identifier representing the upper-link port or an MCLAG identifier corresponding to the upper-link port.

11. The switching device according to claim 10,
wherein, in the case where the destination encapsulation address contained in the received encapsulated frame is the encapsulation address of the switching device or the peer switching device, the relay processing unit retrieves the address table of its own device by using the destination customer address contained in the encapsulated frame as a retrieval key.

* * * * *